US011044701B2

(12) United States Patent
Tang

(10) Patent No.: US 11,044,701 B2
(45) Date of Patent: Jun. 22, 2021

(54) COMMUNICATION METHOD AND COMMUNICATION APPARATUS

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 353 days.

(21) Appl. No.: 16/086,077

(22) PCT Filed: May 10, 2016

(86) PCT No.: PCT/CN2016/081534
§ 371 (c)(1),
(2) Date: Sep. 18, 2018

(87) PCT Pub. No.: WO2017/193276
PCT Pub. Date: Nov. 16, 2017

(65) Prior Publication Data
US 2020/0296693 A1  Sep. 17, 2020

(51) Int. Cl.
*H04W 72/02* (2009.01)
*H04W 76/11* (2018.01)
(Continued)

(52) U.S. Cl.
CPC ........... *H04W 72/02* (2013.01); *H04L 5/0051* (2013.01); *H04L 5/0094* (2013.01); *H04W 8/245* (2013.01);
(Continued)

(58) Field of Classification Search
None
See application file for complete search history.

(56) References Cited

U.S. PATENT DOCUMENTS 8,542,654 B1   9/2013 Dinan
8,553,655 B1  10/2013 Dinan
(Continued)

FOREIGN PATENT DOCUMENTS

CN    102204336 A    9/2011
CN    103517320 A    1/2014
(Continued)

OTHER PUBLICATIONS

Samsung: "Handover with CA—stage 2 level issues", 3GPP DRAFT; R2-103113 Handover With CA—High Level Issues, 3rd Generation Partnership Project (3GPP ), Moble Competence Centre ; 650, Route Des Lucioles ; F-06921 Sophia-Antipolis Cedex ; France, vol. RAN WG2, No. Montreal, Canada; May 10, 2010-May 14, 2010, May 3, 2010 (May 3, 2010), XP050605127, [retrieved on May 3, 2010] * Section 10.1.2.1.1, pp. 5-6.
(Continued)

*Primary Examiner* — Anh Vu H Ly

(57) ABSTRACT

Disclosed in the present invention are a communication method and a communication apparatus, which can improve the data communication efficiency. The method comprises: a control node generates a first transmission configuration message, the first transmission configuration message carrying transmission configuration information of each first serving cell among at least one first serving cell of a terminal device, the transmission configuration information of each first serving cell comprising transmission technology information and/or physical layer parameter information of each transmission configuration set among at least one transmission configuration set of each first serving cell and transmission resource pool information corresponding to the transmission technology information and/or the physical layer parameter information, and the at least one first serving cell belonging to a first transmission node; and the control node
(Continued)

node sends the first transmission configuration message to the first transmission node.

20 Claims, 13 Drawing Sheets

(51) Int. Cl.
*H04L 5/00* (2006.01)
*H04W 8/24* (2009.01)
*H04W 24/10* (2009.01)
*H04W 72/04* (2009.01)
*H04W 72/14* (2009.01)

(52) U.S. Cl.
CPC ......... *H04W 24/10* (2013.01); *H04W 72/042* (2013.01); *H04W 72/044* (2013.01); *H04W 72/14* (2013.01); *H04W 76/11* (2018.02)

(56) References Cited

U.S. PATENT DOCUMENTS

| | | | |
|---|---|---|---|
| 9,125,112 B2* | 9/2015 | Gao | H04W 36/0027 |
| 2013/0188473 A1 | 7/2013 | Dinan | |
| 2013/0188613 A1 | 7/2013 | Dinan | |
| 2013/0188614 A1 | 7/2013 | Dinan | |
| 2013/0188615 A1 | 7/2013 | Dinan | |
| 2013/0188616 A1 | 7/2013 | Dinan | |
| 2013/0188617 A1 | 7/2013 | Dinan | |
| 2013/0188618 A1 | 7/2013 | Dinan | |
| 2013/0188620 A1 | 7/2013 | Dinan | |
| 2013/0329708 A1 | 12/2013 | Dinan | |
| 2013/0336298 A1 | 12/2013 | Dinan | |
| 2014/0056243 A1* | 2/2014 | Pelletier | H04W 72/1268 370/329 |
| 2014/0105175 A1 | 4/2014 | Dinan | |
| 2014/0226481 A1 | 8/2014 | Dahod et al. | |
| 2015/0110041 A1 | 4/2015 | Ren et al. | |
| 2015/0131630 A1 | 5/2015 | Dinan | |
| 2015/0139142 A1 | 5/2015 | Dinan | |
| 2015/0173028 A1 | 6/2015 | Dinan | |
| 2015/0230134 A1 | 8/2015 | Chiba et al. | |
| 2015/0351061 A1 | 12/2015 | Kim et al. | |
| 2015/0373584 A1* | 12/2015 | Hong | H04W 28/08 370/329 |
| 2016/0007332 A1* | 1/2016 | Futaki | H04W 76/15 370/329 |
| 2016/0021592 A1 | 1/2016 | Vesely et al. | |
| 2016/0028585 A1* | 1/2016 | Wager | H04W 76/15 455/452.2 |
| 2016/0029364 A1 | 1/2016 | Dinan | |
| 2016/0037467 A1 | 2/2016 | Dinan | |
| 2016/0057786 A1 | 2/2016 | Dinan | |
| 2016/0081038 A1 | 3/2016 | Dinan | |
| 2016/0088622 A1 | 3/2016 | Dinan | |
| 2016/0112164 A1* | 4/2016 | Worrall | H04W 76/15 370/311 |
| 2016/0143027 A1* | 5/2016 | Kim | H04W 72/0426 370/329 |
| 2016/0219595 A1* | 7/2016 | Larsson | H04W 72/0453 |
| 2016/0278030 A1* | 9/2016 | Yi | H04W 56/00 |
| 2016/0295613 A1* | 10/2016 | Wager | H04L 41/0813 |
| 2016/0353457 A1 | 12/2016 | Park et al. | |
| 2017/0026920 A1 | 1/2017 | Dinan | |
| 2017/0026924 A1* | 1/2017 | Gou | H04W 56/0015 |
| 2017/0034866 A1* | 2/2017 | Wager | H04W 76/27 |
| 2017/0332408 A1 | 11/2017 | Dinan | |
| 2018/0152906 A1 | 5/2018 | Kim et al. | |
| 2018/0176960 A1 | 6/2018 | Dinan | |
| 2018/0242368 A1 | 8/2018 | Dinan | |
| 2018/0310207 A1 | 10/2018 | Dahod et al. | |
| 2019/0007268 A1* | 1/2019 | Wager | H04W 74/0833 |

FOREIGN PATENT DOCUMENTS

| | | |
|---|---|---|
| CN | 105940756 A | 9/2016 |
| CN | 107113904 A | 8/2017 |
| EP | 2257085 A1 | 12/2010 |
| GB | 2522673 A | 8/2015 |
| GB | 2525935 A | 11/2015 |
| GB | 2528913 A | 2/2016 |
| KR | 20160025389 A | 3/2016 |
| WO | 2011107054 A2 | 9/2011 |
| WO | 2014182229 A1 | 11/2014 |
| WO | 2015115737 A1 | 8/2015 |
| WO | 2015115959 A1 | 8/2015 |
| WO | 2015170530 A1 | 11/2015 |

OTHER PUBLICATIONS

Ericsson: "Updates to Intra-LTE handover in 36.300", 3GPP DRAFT; R3-061945, XP050160823.
Partial Supplementary European Search Report in European application No. 16901231.7, dated Nov. 16, 2018.
English Translation of the Written Opinion of the International Searching Authority dated Dec. 28, 2016; PCT/CN2016/081534.
First Office Action of the Indian application No. 201817037144, dated Jun. 4, 2020.
International Search Report in international application No. PCT/CN2016/081534, dated Dec. 28, 2016.
Written Opinion of the International Search Authority in international application No. PCT/CN2016/081534, dated Dec. 28, 2016.
European Search Report in European application No. 16901231.7, dated Feb. 6, 2019.
Huawei, Hisilicon, Flexible air interface of NR, 3GPP TSG-RAN WG2#93bis R2-162660, 3GPP, Apr. 1, 2016.
Nokia, Alcatel-Lucent Shanghai Bell, Basic frame structure principles for 5G new radio, 3GPP TSG-RAN WG1#84b R1-162893, 3GPP, Apr. 1, 2016.
ZTE, Consideration on forward compatibility for new radio interface, 3GPP TSG-RAN WG1#84b R1-163392, 3GPP, Apr. 7, 2016.
First Office Action of the Japanese application No. 2016-550369, dated Dec. 13, 2019.
First Office Action of the European application No. 16901231.7, dated Sep. 26, 2019.
Office Action of the Taiwanese application No. 106115045, dated Jan. 8, 2021.

* cited by examiner

COMMUNICATION METHOD AND COMMUNICATION APPARATUS

TECHNICAL FIELD

Embodiments of the disclosure relate to the field of communication, and more particularly to a communication method and a communication device.

BACKGROUND

A Long Term Evolution Advanced (LTE-A) system can support Carrier Aggregation (CA) and dual connectivity technologies. In the technologies, a terminal equipment may perform data communication with another cell after establishing a Radio Resource Control (RRC) connection with a cell, thereby improving efficiency of data transmission between a network and the terminal equipment. Specifically, as illustrated in FIG. 1a, in a Downlink (DL) direction, a core network (for example, a Mobile Management Entity (MME)) may send data to a Macro Evolved Node B (MeNB) through an S1 interface. The MeNB may forward a part of the data to a plurality of Secondary Evolved Node Bs (SeNBs) through an X2 interface. Finally, the MeNB and the SeNBs simultaneously send the data to terminal equipment. As illustrated in FIG. 1b, in an Uplink (UL) direction, a terminal equipment may send data to an SeNB and an MeNB respectively, the SeNB forwards the data to the MeNB through an X2 interface. Finally, the MeNB sends the data to a core network (for example, a Serving GateWay (SGW)) through an S1 interface.

A next-generation mobile communication system (for example, a 5th-Generation (5G) system) requires higher data transmission efficiency to be provided. According to different service requirements of a terminal equipment, the concept of dual connectivity is proposed in the industry. That is, an MeNB with wide coverage serves as a control node, other nodes serve as transmission nodes, and the terminal equipment may simultaneously communicate with the control node and the transmission nodes to form a dual connectivity mode. However, for new requirements of the next-generation mobile communication system, a dual connectivity technology is still confronted with multiple technical problems which have yet not been solved.

SUMMARY

The embodiments of the disclosure provide a communication method and a communication device, which may improve data transmission efficiency.

A first aspect provides a communication method, which may include that: a control node generates a first transmission configuration message. Here, the first transmission configuration message may contain transmission configuration information of each of at least one first serving cell of a terminal equipment, the transmission configuration information of each first serving cell may include transmission scheme information and/or Physical (PHY) parameter information of each of at least one transmission configuration set of the first serving cell, and transmission resource pool information corresponding to the transmission scheme information and/or the PHY parameter information, and the at least one first serving cell may belong to a first transmission node; and the control node sends the first transmission configuration message to the first transmission node.

Specifically, the control node may send the first transmission configuration message to the first transmission node, and the first transmission configuration message may be configured to configure a communication format between the first transmission node and the terminal equipment. Optionally, the first transmission configuration message may contain information of the at least one transmission configuration set of each first serving cell in the at least one first serving cell belonging to the first transmission node.

Optionally, the transmission configuration information of each first serving cell may further include: serial number information of each of the at least one transmission configuration set of the first serving cell.

Optionally, the transmission configuration information of each first serving cell may further include: an activation indication, deactivation indication or validity period information corresponding to each of the at least one transmission configuration set of the first serving cell.

According to the communication method provided by the embodiments of the disclosure, the control node controls a transmission configuration for communication between each secondary serving cell in at least one secondary serving cell and the terminal equipment, the transmission configuration includes at least one transmission configuration set, and different transmission configuration sets may correspond to different transmission resource pools, transmission schemes, PHY parameters or any combination thereof, so that the at least one transmission configuration set of the at least one secondary serving cell may meet different service requirements of the terminal equipment to further improve overall performance of a system and improve a user experience.

In a first possible implementation mode of the first aspect, the method may further include that: the control node sends a second transmission configuration message to the terminal equipment, the second transmission configuration message containing transmission configuration information of each of at least one serving cell of the terminal equipment. Here, the at least one serving cell may include the at least one first serving cell.

Specifically, the second transmission configuration message may be configured to configure a communication format between the terminal equipment and at least one transmission node of the terminal equipment. Here, the at least one transmission node may include the first transmission node. Optionally, the second transmission configuration message may contain information of at least one transmission configuration set of each of at least one serving cell of each transmission node in the at least one transmission node. Optionally, the second transmission configuration message may further contain identification information of each transmission node in the at least one transmission node and/or identification information of each of the at least one serving cell.

In combination with the abovementioned possible implementation mode, in a second possible implementation mode of the first aspect, the method may further include that: the control node sends a first scheduling message to the first transmission node, the first scheduling message containing information of at least one UL grant and/or information of at least one DL Scheduling Assignment (SA) configured to schedule data transmission between each of at least one first target serving cell and the terminal equipment and the at least one first serving cell including the at least one first target serving cell.

Optionally, the control node may schedule at least one UL or DL data transmission between each first target serving cell and the terminal equipment through the first scheduling message.

In combination with the abovementioned possible implementation modes, in a third possible implementation mode of the first aspect, the method may further include that: the control node sends a second scheduling message to the terminal equipment, the second scheduling message containing at least one information of at least one UL grant or information of at least one DL SA configured to schedule data transmission between each of in at least one target serving cell of the terminal equipment and the terminal equipment.

Optionally, the at least one target serving cell includes the at least one first target serving cell. Here, the at least one target serving cell may be part of or all cells in all the secondary serving cells (i.e., the at least one serving cell) of the terminal equipment.

Optionally, the second scheduling message may be configured to schedule UL and/or DL data transmission between each target transmission node in at least one target transmission node and the terminal equipment. Here, the at least one target transmission node may be part of or all nodes in all the transmission nodes of the terminal equipment. Optionally, the second scheduling message may be configured to schedule data transmission between one or more cells of the serving cells, belonging to the terminal equipment, of the target transmission nodes and the terminal equipment.

Optionally, the first scheduling message may further contain identification information of the terminal equipment.

According to the communication method provided by the embodiments of the disclosure, the control node schedules at least one UL data transmission and/or at least one DL data transmission between each cell in at least one cell of each transmission node in one or more multiple transmission nodes and the terminal equipment, so that data transmission efficiency may be improved, and the system performance may be improved.

In combination with the abovementioned possible implementation modes, in a fourth possible implementation mode of the first aspect, before the operation that the control node generates the first transmission configuration message, the method may further include that: the control node sends a reference signal configuration message to each of at least one candidate transmission node of the terminal equipment, the reference signal configuration message containing DL reference signal configuration information of each of at least one candidate serving cell of each candidate transmission node and the at least one candidate transmission node including the first transmission node.

The at least one candidate transmission node of the terminal equipment may include the at least one transmission node, each candidate transmission node may include one or more candidate serving cells of the terminal equipment, and the at least one serving cell of the terminal equipment may be selected from a candidate serving cell set of the terminal equipment.

In combination with the abovementioned possible implementation modes, in a fifth possible implementation mode of the first aspect, the method may further include that: the control node sends a measurement report request to the terminal equipment, the measurement report request containing DL reference signal configuration information of each of multiple candidate serving cells of the terminal equipment. Here, the multiple candidate serving cells may belong to the at least one candidate transmission node of the terminal equipment; the control node receives a measurement report sent by the terminal equipment according to the measurement report request, the measurement report containing a result of measurement performed by the terminal equipment on a DL reference signal sent by each of the multiple candidate serving cells; and the control node determines the at least one serving cell of the terminal equipment from the multiple candidate serving cells according to the measurement report.

Optionally, the measurement report request may contain the DL reference signal configuration information of one or more candidate serving cells of each of the at least one candidate transmission node.

Optionally, the control node may also send indication information configured to indicate the at least one serving cell and/or the nodes to which the at least one serving cell belongs to the terminal equipment.

Optionally, the DL reference signal configuration information may include at least one of: information of a time-frequency resource, information of a code-domain resource or information of a space-domain resource. Here, the information of the time-frequency resource may include information of at least one physical resource block.

Optionally, the time-frequency resource occupied by the DL reference signal may take a physical resource block as a unit. Specifically, the DL reference signal may occupy one or more physical resource blocks in one or more specific subframes.

In combination with the abovementioned possible implementation modes, in a sixth possible implementation mode of the first aspect, before the operation that the control node sends the reference signal configuration message to each of the at least one candidate transmission node of the terminal equipment, the method may further include that: the control node receives a request message sent by the terminal equipment, the request message containing identification information of each of the multiple candidate serving cells of the terminal equipment, the identification information of each candidate serving cell indicating that a node type of the candidate transmission node to which the candidate serving cell belongs is a first type or a second type, a node of the first type having a capability of serving as a control node and a node of the second type having no capability of serving as a control node. Here, the operation that the control node sends the reference signal configuration message to each of the at least one candidate transmission node of the terminal equipment may include that: the control node sends the reference signal configuration message to each of the at least one candidate transmission node of the terminal equipment according to the request message.

In combination with the abovementioned possible implementation modes, in a seventh possible implementation mode of the first aspect, before the operation that the control node generates the first transmission configuration message, the method may further include that: the control node sends identification information of a cell of the control node to the terminal equipment, the identification information of the cell of the control node indicating that the control node has the capability of serving as a control node.

A second aspect provides another communication method, which may include that: a first transmission node receives a first transmission configuration message sent by a control node, the first transmission configuration message containing transmission configuration information of each of at least one first serving cell of the first transmission node and the transmission configuration information of each first serving cell including transmission scheme information and/or PHY parameter information of each of at least one transmission configuration set of the first serving cell, and transmission resource pool information corresponding to the transmission scheme information and/or the PHY parameter information; and the first transmission node performs communication with a terminal equipment through the at least one first serving cell according to the first transmission configuration message.

Optionally, the transmission configuration information of each first serving cell may further include: serial number information of each of the at least one transmission configuration set of the first serving cell.

Optionally, the transmission configuration information of each first serving cell may further include: an activation indication, deactivation indication or validity period information corresponding to each of the at least one transmission configuration set of the first serving cell.

In a first possible implementation mode of the second aspect, the method may further include that: the first transmission node receives a first scheduling message sent by the control node, the first scheduling message containing at least one information of at least one UL grant or information of at least one DL SA configured to schedule data transmission between each of at least one first target serving cell and the terminal equipment and the at least one first serving cell including the at least one first target serving cell; and the first transmission node performs data transmission with the terminal equipment through the at least one first target serving cell according to the first scheduling message.

Optionally, the first scheduling message may further contain identification information of the terminal equipment.

In combination with the abovementioned possible implementation mode, in a second possible implementation mode of the second aspect, before the operation that the first transmission node receives the first transmission configuration message sent by the control node, the method may further include that: the first transmission node receives a reference signal configuration message sent by the control node, the reference signal configuration message containing DL reference signal configuration information of at least one candidate serving cell of the first transmission node. Here, the at least one candidate serving cell of the first transmission node may include the at least one first serving cell; and the first transmission node sends a DL reference signal through the at least one candidate serving cell according to the reference signal configuration message.

In combination with the abovementioned possible implementation modes, in a third possible implementation mode of the second aspect, before the operation that the first transmission node receives the reference signal configuration message sent by the control node, the method may further include that: the first transmission node sends identification information of each of the at least one candidate serving cell of the first transmission node to the terminal equipment, the identification information of each candidate serving cell indicating that a node type of the first transmission node is a first type or a second type, a node of the first type having a capability of serving as a control node and a node of the second type having no capability of serving as a control node.

A third aspect provides another communication method, which may include that: a terminal equipment receives a second transmission configuration message sent by a control node, the second transmission configuration message containing transmission configuration information of each of at least one serving cell of the terminal equipment and the transmission configuration information of each serving cell including transmission scheme information and/or PHY parameter information of each of at least one transmission configuration set of the serving cell and transmission resource pool information corresponding to the transmission scheme information and/or the PHY parameter information; and the terminal equipment performs communication with the at least one serving cell according to the second transmission configuration message.

Optionally, the transmission configuration information of each serving cell may further include: serial number information of each of the at least one transmission configuration set of the serving cell.

Optionally, the transmission configuration information of each serving cell may further include: an activation indication, deactivation indication or validity period information corresponding to each of the at least one transmission configuration set of the serving cell.

In a first possible implementation mode of the third aspect, the method may further include that: the terminal equipment receives a second scheduling message sent by the control node, the second scheduling message containing at least one information of at least one UL grant or information of at least one DL SA configured to schedule data transmission between each of in at least one target serving cell and the terminal equipment and the at least one serving cell of the terminal equipment including the at least one target serving cell; and the terminal equipment performs data transmission with the at least one target serving cell according to the second scheduling message.

In combination with the abovementioned possible implementation mode, in a second possible implementation mode of the third aspect, before the operation that the terminal equipment receives the second transmission configuration message sent by the control node, the method may further include that: the terminal equipment receives a measurement report request sent by the control node, the measurement report request containing DL reference signal configuration information of each of at least one candidate serving cell of the terminal equipment and the at least one candidate serving cell of the terminal equipment including the at least one serving cell; and the terminal equipment measures a DL reference signal sent by each of the at least one candidate serving cell according to the measurement report request.

In combination with the abovementioned possible implementation modes, in a third possible implementation mode of the third aspect, before the operation that the terminal equipment receives the measurement report request sent by the control node, the method may further include that: the terminal equipment receives identification information of at least one cell of each of multiple nodes from the node. Here, the identification information of each cell may be configured to indicate that a node type of the node to which the cell belongs is a first type or a second type, a node of the first type may have a capability of serving as a control node, a node of the second type may have no capability of serving as a control node, and the multiple nodes may include the control node and at least one transmission node; and the terminal equipment determines the control node and the at least one transmission node according to the received identification information of each cell in multiple cells.

According to the communication method provided by the embodiments of the disclosure, the control node configures the DL reference signals of each of multiple candidate serving cells of the terminal equipment, so that sending of the DL reference signals of each node may be coordinated, and reduction in interference between the cells and reduction in power consumption of the nodes are facilitated.

A fourth aspect provides another communication method, which may include that: a control node generates a reference signal configuration message, the reference signal configuration message containing DL reference signal configuration information of each of at least one first candidate serving cell of a terminal equipment and the at least one first candidate serving cell belonging to a first candidate transmission node; and the control node sends the reference signal configuration message to the first candidate transmission node.

In a first possible implementation mode of the fourth aspect, the method may further include that: the control node sends a measurement report request to the terminal equipment, the measurement report request containing DL reference signal configuration information of each of at least one candidate serving cell of the terminal equipment. Here, the at least one candidate serving cell may include the at least one candidate serving cell; the control node receives a measurement report sent by the terminal equipment according to the measurement report request, the measurement report containing a result of measurement performed by the terminal equipment on a DL reference signal sent by each of the at least one candidate serving cell; and the control node determines at least one serving cell of the terminal equipment from the at least one candidate serving cell according to the measurement report.

Optionally, the terminal equipment may have at least one candidate serving cell, and the at least one candidate serving cell may include the at least one first candidate serving cell belonging to the first candidate transmission node.

In combination with the abovementioned possible implementation mode, in a second possible implementation mode of the fourth aspect, before the operation that the control node sends the measurement report request to the terminal equipment, the method may further include that: the control node receives identification information of each of the at least one candidate serving cell from the terminal equipment, the identification information of each candidate serving cell indicating that a node type of a candidate transmission node to which the candidate serving cell belongs is a first type or a second type, a node of the first type having a capability of serving as a control node and a node of the second type having no capability of serving as a control node. Here, the operation that the control node sends the measurement report request to the terminal equipment may include that: the control node sends the measurement report request to the terminal equipment according to the identification information of each of the at least one candidate serving cell.

In combination with the abovementioned possible implementation modes, in a third possible implementation mode of the fourth aspect, before the operation that the control node generates the reference signal configuration message, the method may further include that: the control node sends identification information of a cell of the control node to the terminal equipment, the identification information of the cell of the control node indicating that the control node has the capability of serving as a control node.

In combination with the abovementioned possible implementation modes, in a fourth possible implementation mode of the fourth aspect, the method may further include that: the control node sends a first scheduling message to the first candidate transmission node, the first scheduling message containing at least one information of at least one UL grant or information of at least one DL SA configured to schedule data transmission between each of at least one first target serving cell of the terminal equipment and the terminal equipment. Here, the at least one first candidate serving cell may include the at least one first target serving cell.

In combination with the abovementioned possible implementation modes, in a fifth possible implementation mode of the fourth aspect, the method may further include that: the control node sends a second scheduling message to the terminal equipment, the second scheduling message containing at least one information of at least one UL grant or information of at least one DL SA configured to schedule data transmission between each of in at least one target serving cell of the terminal equipment and the terminal equipment.

Optionally, the first scheduling message may further contain identification information of the terminal equipment.

A fifth aspect provides another communication method, which may include that: a first node receives a reference signal configuration message sent by a control node, the reference signal configuration message containing DL reference signal configuration information of each of at least one first candidate serving cell of a terminal equipment, the DL reference signal configuration information including at least one of: information of a time-frequency resource, information of a code-domain resource or information of a space-domain resource, the information of the time-frequency resource including information of at least one physical resource block and the at least one first candidate serving cell belonging to the first node; and the first node sends a DL reference signal through the at least one first candidate serving cell according to the reference signal configuration message.

Optionally, the first node may specifically be the first transmission node or a first candidate transmission node.

In a first possible implementation mode of the fifth aspect, before the operation that the first node receives the reference signal configuration message sent by the control node, the method may further include that: the first node sends identification information of each of the at least one first candidate serving cell to the terminal equipment, the identification information of each first candidate serving cell indicating that a node type of the first node is a first type or a second type, a node of the first type having a capability of serving as a control node and a node of the second type having no capability of serving as a control node.

The at least one first candidate serving cell of the terminal equipment belongs to the first node.

In combination with the abovementioned possible implementation mode, in a second possible implementation mode of the fifth aspect, the method may further include that: the first node receives a first scheduling message sent by the control node, the first scheduling message containing at least one information of at least one UL grant or information of at least one DL SA configured to schedule data transmission between each of at least one first target serving cell and the terminal equipment and the at least one first candidate serving cell including the at least one first target serving cell; and the first node performs data transmission with the terminal equipment through the at least one first target serving cell according to the first scheduling message.

Optionally, the first scheduling message may further contain identification information of the terminal equipment.

A sixth aspect provides another communication method, which may include that: a terminal equipment receives a measurement report request sent by a control node, the measurement report request containing DL reference signal configuration information of each of at least one candidate serving cell of the terminal equipment; and the terminal equipment measures a DL reference signal sent by each of the at least one candidate serving cell according to the measurement report request.

In a first possible implementation mode of the sixth aspect, before the operation that the terminal equipment receives the measurement report request sent by the control node, the method may further include that: the terminal equipment receives identification information of each of the at least one candidate serving cell. Here, the identification information of each candidate serving cell may be configured to indicate that a node type of each candidate serving cell is a first type or a second type, a node of the first type may have a capability of serving as a control node, and a node of the second type may have no capability of serving as a control node; and the terminal equipment sends a request message to the control node, the request message containing the identification information of each of the at least one candidate serving cell. Here, the operation that the terminal equipment receives the measurement report request sent by the control node may include that: the terminal equipment receives the measurement report request sent by the control node according to the request message.

In combination with the abovementioned possible implementation mode, in a second possible implementation mode of the sixth aspect, the method may further include that: the terminal equipment receives a second scheduling message sent by the control node, the second scheduling message containing at least one information of at least one UL grant or information of at least one DL SA configured to schedule data transmission between at least one target serving cell and the terminal equipment. Here, the at least one candidate serving cell may include the at least one target serving cell.

A seventh aspect provides another communication method, which may include that: a control node generates a first scheduling message, the first scheduling message containing at least one information of at least one UL grant or information of at least one DL SA configured to schedule data transmission between at least one first target serving cell and a terminal equipment and the at least one first target serving cell belonging to a first transmission node; and the control node sends the first scheduling message to the first transmission node.

Optionally, the first scheduling message may further contain identification information of the terminal equipment.

In a first possible implementation mode of the seventh aspect, the method may further include that: the control node sends a second scheduling message to the terminal equipment, the second scheduling message containing at least one information of at least one UL grant or information of at least one DL SA configured to schedule data transmission between each of in at least one target serving cell and the terminal equipment. Here, the at least one target serving cell may include the at least one first target serving cell.

An eighth aspect provides another communication method, which may include that: a first transmission node receives a first scheduling message sent by a control node, the first scheduling message containing at least one information of at least one UL grant or information of at least one DL SA configured to schedule data transmission between each of at least one first target serving cell of the first transmission node and a terminal equipment; and the first transmission node performs data transmission with the terminal equipment through the at least one first target serving cell according to the first scheduling message.

Optionally, the first scheduling message may further contain identification information of the terminal equipment.

In some aspects of the disclosure, optionally, the PHY parameter information may include at least one of a subcarrier spacing, a frame structure, a chip rate or a common control channel configuration.

In some aspects of the disclosure, optionally, the transmission scheme information may include at least one of a duplex manner or a multiple access scheme technology.

In some aspects of the disclosure, optionally, the transmission resource pool information may include at least one of: a time-domain resource, a frequency-domain resource, the code-domain resource and the space-domain resource.

In some aspects of the disclosure, optionally, the information of the at least one UL grant may include serial number information of the transmission configuration set corresponding to each of the at least one UL grant.

In some aspects of the disclosure, optionally, the information of the at least one DL SA may include serial number information of the transmission configuration set corresponding to each of the at least one DL SA.

In some aspects of the disclosure, optionally, the DL reference signal configuration information may include at least one of: the information of the time-frequency resource, the information of the code-domain resource and the information of the space-domain resource. Here, the information of the time-frequency resource may include the information of the at least one physical resource block.

A ninth aspect provides a communication device, which is configured to execute the method in the first aspect or any possible implementation mode of the first aspect. Specifically, the device may include units configured to execute the method in the first aspect or any possible implementation mode of the first aspect.

A tenth aspect provides a communication device, which is configured to execute the method in the second aspect or any possible implementation mode of the second aspect. Specifically, the device may include units configured to execute the method in the second aspect or any possible implementation mode of the second aspect.

An eleventh aspect provides a communication device, which is configured to execute the method in the third aspect or any possible implementation mode of the third aspect. Specifically, the device may include units configured to execute the method in the third aspect or any possible implementation mode of the third aspect.

A twelfth aspect provides a communication device, which is configured to execute the method in the fourth aspect or any possible implementation mode of the fourth aspect. Specifically, the device may include units configured to execute the method in the fourth aspect or any possible implementation mode of the fourth aspect.

A thirteenth aspect provides a communication device, which is configured to execute the method in the fifth aspect or any possible implementation mode of the fifth aspect. Specifically, the device may include units configured to execute the method in the fifth aspect or any possible implementation mode of the fifth aspect.

A fourteenth aspect provides a communication device, which is configured to execute the method in the sixth aspect or any possible implementation mode of the sixth aspect. Specifically, the device may include units configured to execute the method in the sixth aspect or any possible implementation mode of the sixth aspect.

A fifteenth aspect provides a communication device, which is configured to execute the method in the seventh aspect or any possible implementation mode of the seventh aspect. Specifically, the device may include units configured to execute the method in the seventh aspect or any possible implementation mode of the seventh aspect.

A sixteenth aspect provides a communication device, which is configured to execute the method in the eighth aspect or any possible implementation mode of the eighth aspect. Specifically, the device may include units configured to execute the method in the eighth aspect or any possible implementation mode of the eighth aspect.

A seventeenth aspect provides a communication device, which includes a storage unit and a processor. Here, the storage unit is configured to store an instruction, the processor is configured to execute the instruction stored in the memory, and when the processor executes the instruction stored in the memory, such execution enables the processor to execute the method in the first aspect or any possible implementation mode of the first aspect.

An eighteenth aspect provides a communication device, which includes a storage unit and a processor. Here, the storage unit is configured to store an instruction, the processor is configured to execute the instruction stored in the memory, and when the processor executes the instruction stored in the memory, such execution enables the processor to execute the method in the second aspect or any possible implementation mode of the second aspect.

A nineteenth aspect provides a communication device, which includes a storage unit and a processor. Here, the storage unit is configured to store an instruction, the processor is configured to execute the instruction stored in the memory, and when the processor executes the instruction stored in the memory, such execution enables the processor to execute the method in the third aspect or any possible implementation mode of the third aspect.

A twentieth aspect provides a communication device, which includes a storage unit and a processor. Here, the storage unit is configured to store an instruction, the processor is configured to execute the instruction stored in the memory, and when the processor executes the instruction stored in the memory, such execution enables the processor to execute the method in the fourth aspect or any possible implementation mode of the fourth aspect.

A twenty-first aspect provides a communication device, which includes a storage unit and a processor. Here, the storage unit is configured to store an instruction, the processor is configured to execute the instruction stored in the memory, and when the processor executes the instruction stored in the memory, such execution enables the processor to execute the method in the fifth aspect or any possible implementation mode of the fifth aspect.

A twenty-second aspect provides a communication device, which includes a storage unit and a processor. Here, the storage unit is configured to store an instruction, the processor is configured to execute the instruction stored in the memory, and when the processor executes the instruction stored in the memory, such execution enables the processor to execute the method in the sixth aspect or any possible implementation mode of the sixth aspect.

A twenty-third aspect provides a communication device, which includes a storage unit and a processor. Here, the storage unit is configured to store an instruction, the processor is configured to execute the instruction stored in the memory, and when the processor executes the instruction stored in the memory, such execution enables the processor to execute the method in the seventh aspect or any possible implementation mode of the seventh aspect.

A twenty-fourth aspect provides a communication device, which includes a storage unit and a processor. Here, the storage unit is configured to store an instruction, the processor is configured to execute the instruction stored in the memory, and when the processor executes the instruction stored in the memory, such execution enables the processor to execute the method in the eighth aspect or any possible implementation mode of the eighth aspect.

A twenty-fifth aspect provides a computer-readable medium, which is configured to store a computer program, the computer program including an instruction configured to execute the method in the first aspect or any possible implementation mode of the first aspect.

A twenty-sixth aspect provides a computer-readable medium, which is configured to store a computer program, the computer program including an instruction configured to execute the method in the second aspect or any possible implementation mode of the second aspect.

A twenty-seventh aspect provides a computer-readable medium, which is configured to store a computer program, the computer program including an instruction configured to execute the method in the third aspect or any possible implementation mode of the third aspect.

A twenty-eighth aspect provides a computer-readable medium, which is configured to store a computer program, the computer program including an instruction configured to execute the method in the fourth aspect or any possible implementation mode of the fourth aspect.

A twenty-ninth aspect provides a computer-readable medium, which is configured to store a computer program, the computer program including an instruction configured to execute the method in the fifth aspect or any possible implementation mode of the fifth aspect.

A thirtieth aspect provides a computer-readable medium, which is configured to store a computer program, the computer program including an instruction configured to execute the method in the sixth aspect or any possible implementation mode of the sixth aspect.

A thirty-first aspect provides a computer-readable medium, which is configured to store a computer program, the computer program including an instruction configured to execute the method in the seventh aspect or any possible implementation mode of the seventh aspect.

A thirty-second aspect provides a computer-readable medium, which is configured to store a computer program, the computer program including an instruction configured to execute the method in the eighth aspect or any possible implementation mode of the eighth aspect.

A thirty-third aspect provides a communication system, which includes the device in the ninth aspect or any possible implementation mode of the ninth aspect, the device in the tenth aspect or any possible implementation mode of the tenth aspect and the device in the eleventh aspect or any possible implementation mode of the eleventh aspect, or includes the device in the twelfth aspect or any possible implementation mode of the twelfth aspect, the device in the thirteenth aspect or any possible implementation mode of the thirteenth aspect and the device in the fourteenth aspect or any possible implementation mode of the fourteenth aspect, or includes the device in the fifteenth aspect or any possible implementation mode of the fifteenth aspect, the device in the sixteenth aspect or any possible implementation mode of the sixteenth aspect and a terminal equipment.

BRIEF DESCRIPTION OF DRAWINGS

In order to describe the technical solutions of the embodiments of the disclosure more clearly, the drawings required to be used in descriptions about the embodiments of the disclosure or a conventional art will be simply introduced below. It is apparent that the drawings described below are only some embodiments of the disclosure. Other drawings may further be obtained by those of ordinary skilled in the art according to these drawings without creative work.

DETAILED DESCRIPTION

The technical solutions in the embodiments of the disclosure will be clearly and completely described below in conjunction with the drawings in the embodiments of the disclosure. It is apparent that the described embodiments are not all embodiments but part of embodiments of the disclosure. All other embodiments obtained by those of ordinary skilled in the art on the basis of the embodiments in the disclosure without creative work shall fall within the scope of protection of the disclosure.

It is to be understood that terms "system" and "network" in the disclosure may usually be exchanged in the disclosure.

In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Figure 1A:
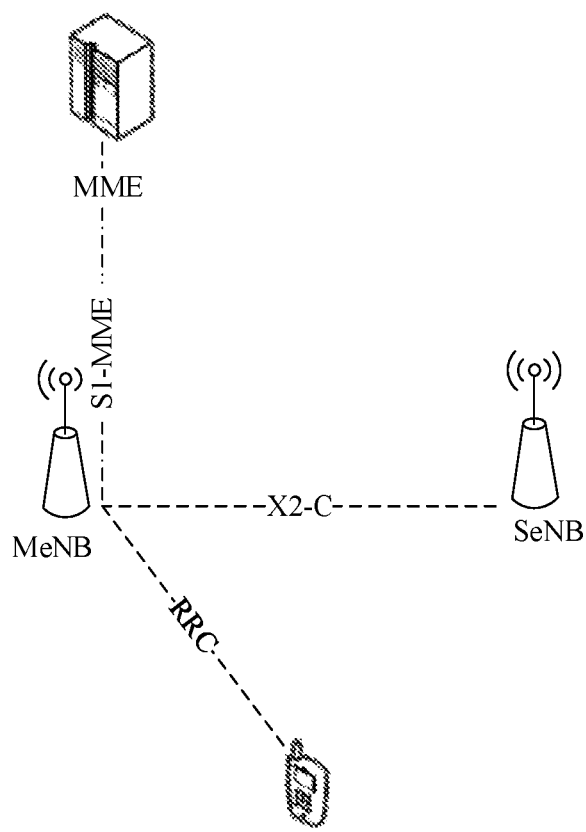
FIG. 1a is a schematic diagram of DL transmission in a related dual connectivity technology.
Figure 1B:
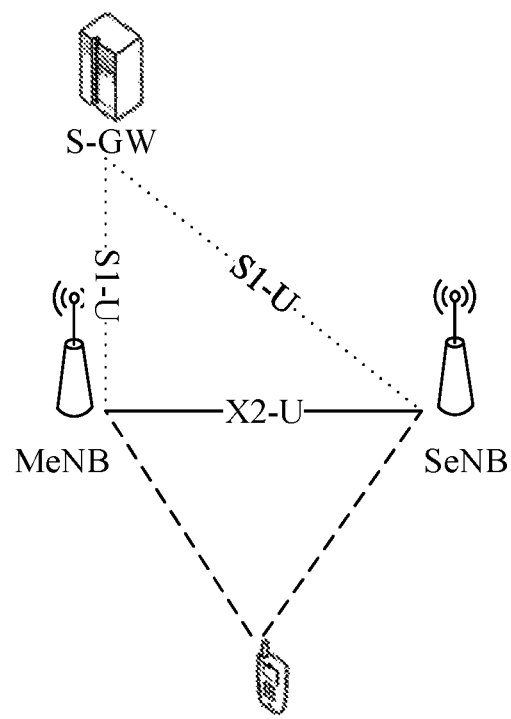
FIG. 1b is a schematic diagram of UL transmission in a related dual connectivity technology.
Figure 2:
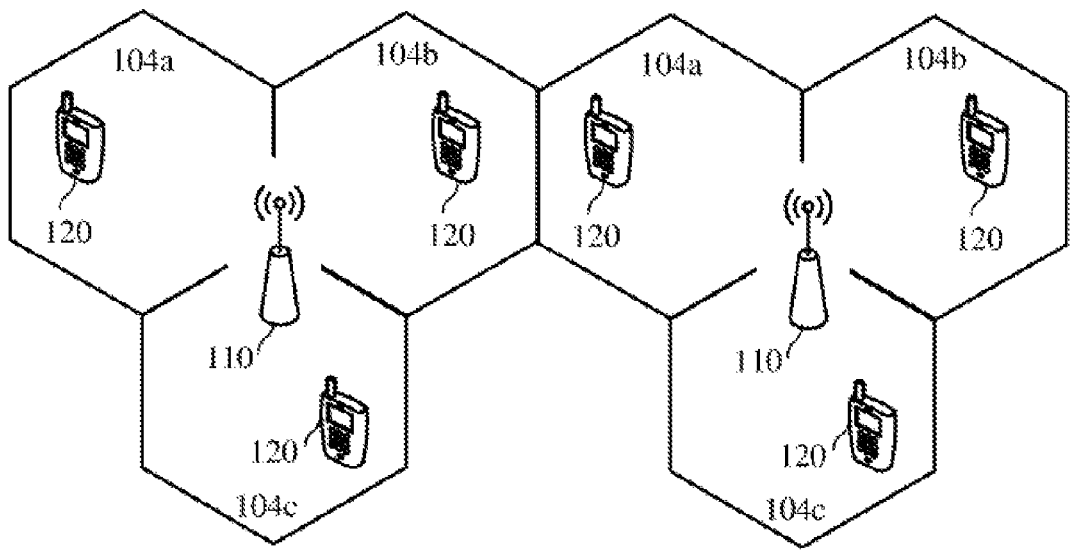
FIG. 2 is a schematic diagram of a wireless communication system to which the embodiments of the disclosure are applied.

FIG. 2 is an architecture diagram of a wireless communication system 100 to which the embodiments of the disclosure may be applied. The wireless communication system 100 may be a Global System of Mobile Communication (GSM), a Code Division multiple access scheme (CDMA) system, a Wideband Code Division multiple access scheme (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system, a future 5G system or the like.

As illustrated in FIG. 2, the wireless communication system 100 includes multiple Transmission and Reception Points (TRPs) 110 and multiple pieces of a terminal equipment 120. For simplicity, only two TRPs are illustrated herein. However, the number of the TRPs is not limited in the embodiments of the disclosure. Each TRP may provide communication coverage for a specific geographic region, the coverage region of the TRP may be divided into multiple smaller regions, and each smaller region may be called a cell. In FIG. 2, the coverage region of the TRP 110 is exemplarily divided into three cells 104a, 104b and 104c. However, in the embodiments of the disclosure, a TRP may support one or more cells. There are no limits made in the embodiments of the disclosure.

The multiple pieces of a terminal equipment 120 located within the coverage of the TRPs are also illustrated in FIG. 2. For simplicity, only one piece of a terminal equipment in each cell is exemplarily illustrated only. However, the number of the terminal equipment in the cells is not limited in the embodiments of the disclosure.

In the embodiments of the disclosure, the TRPs may be connected with the terminal equipment located within their coverage in a wireless or wired or another manner, and moreover, the TRPs may support simultaneous transmission of multiple cellular carriers. As an optional example, the TRPs and the terminal equipment may communicate through air interfaces (for example, Uu interfaces), communication links from the TRPs to the terminal equipment are called DLs, communication links from the terminal equipment to the TRPs are called ULs, and different TRPs may communicated through network interfaces (for example, X2 interfaces).

In the embodiments of the disclosure, the terminal equipment may refer to an access terminal, User Equipment (UE), a user unit, a user station, a mobile station, a mobile radio station, a remote station, a remote terminal, mobile equipment, a user terminal, a terminal, wireless communication equipment, a user agent or a user device. The access terminal may be a cell phone, a cordless phone, a Session Initiation Protocol (SIP) phone, a Wireless Local Loop (WLL) station, a Personal Digital Assistant (PDA), handheld equipment with a wireless communication function, computing equipment, other processing equipment connected to a wireless modem, vehicle-mounted equipment, wearable equipment, terminal equipment in a future 5G network, a terminal equipment in a future evolved Public Land Mobile Network (PLMN) or the like.

In the embodiments of the disclosure, the TRP may be equipment configured to communicate with the terminal equipment. The TRP may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN), or the TRP may be a relay station, an access point, vehicle-mounted equipment, wearable equipment, network equipment in the future 5G network, a node in the future evolved PLMN or the like.

The wireless communication system 100 may further include other network equipment which is not illustrated in FIG. 2 for simplicity. However, the embodiments of the disclosure are not limited.

In the wireless communication system 100, the TRPs may adopt different transmission schemes in cells managed by them, for example, adopting different duplex modes and multiple access schemes, and may adopt different PHY parameters, for example, adopting different subcarrier spacings, chip rates and frame structures. In addition, the TRPs may also use different transmission schemes and PHY parameters on different time-frequency resources in the same cell, which will not be limited in the embodiments of the disclosure.

In addition, the wireless communication system 100 may support a dual connectivity technology. That is, the terminal equipment may keep connected with multiple TRPs at the same time. Here, the multiple TRPs may include a control node and at least one transmission node of the terminal equipment. Here, the control node may form a control-plane connection and a data-plane connection with the terminal equipment and may transmit control signaling and data to the terminal equipment. And each transmission node may form a data-plane connection with the terminal equipment and transmit data to the terminal equipment. However, the embodiments of the disclosure are not limited. In the embodiments of the disclosure, a node with a capability of serving as a control node may be defined into a node of a first type, and a node without the capability of serving as a control node may be defined into a node of a second type. Here, the node of the first type may serve as a control node or a transmission node. For example, the node of the first type may have a complete wireless network protocol function as well as a capability of establishing a control-plane connection (for example, an RRC connection) with the terminal equipment, while the node of the second type may not have a complete wireless network protocol capability, or may not serve as a control node because of limited coverage. However, the embodiments of the disclosure are not limited.

Correspondingly, the terminal equipment may have multiple serving cells. Here, the multiple serving cells may include serving cells belonging to the control node and serving cells belonging to the transmission nodes. For convenient description, the serving cells belonging to the control node of the terminal equipment are called primary serving cells of the terminal equipment and the serving cells belonging to the transmission nodes of the terminal equipment are called secondary serving cells of the terminal equipment below. However, those skilled in the art may know that the abovementioned names do not form any limit to the embodiments of the disclosure.

It is to be understood that term "cell of a node" may refer to a cell belonging to the node. Similarly, term "serving cell of a node" may specifically refer to a cell belonging to the node and serving as a serving cell of certain terminal equipment, i.e., a serving cell belonging to the terminal equipment of the node.

An embodiment of the disclosure provides a communication method 200. The method 200 may be applied to various wireless communication systems, and for example, may be applied to the wireless communication system 100 illustrated in FIG. 2. However, the embodiment of the disclosure is not limited.

Figure 3:
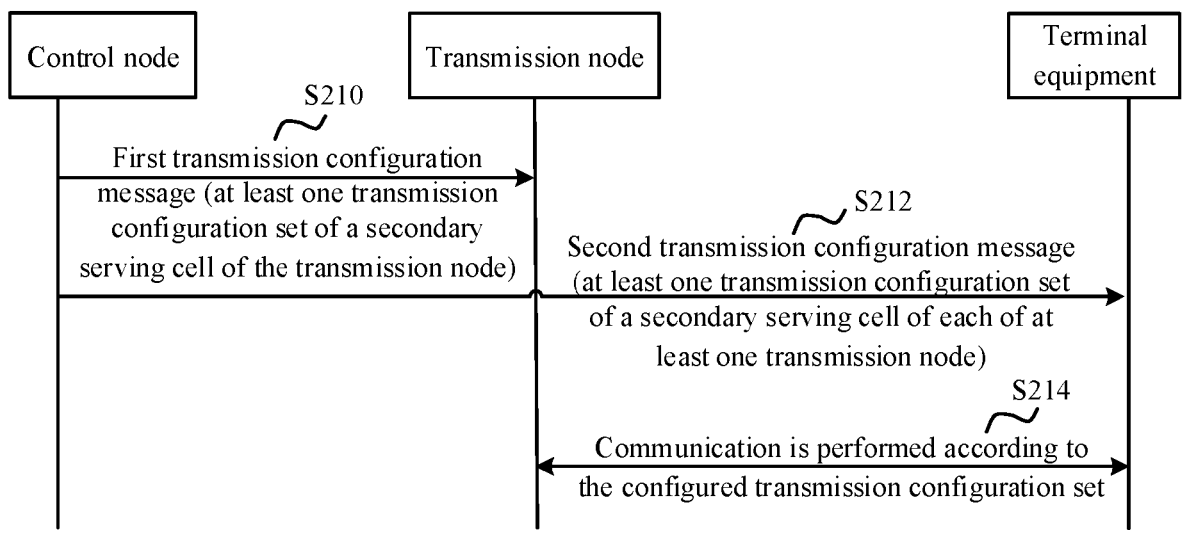
FIG. 3 is a schematic flowchart of a communication method according to an embodiment of the disclosure.

As an optional embodiment, a control node of a terminal equipment may configure a transmission format or transmission parameter between at least one secondary serving cell of the terminal equipment and the terminal equipment. At this moment, as illustrated in FIG. 3, the method 200 may include S210 to S214. However, the embodiment of the disclosure is not limited. Specifically, the control node may send a first transmission configuration message to a first transmission node in at least one transmission node of the terminal equipment. Here, the first transmission configuration message sent to the first transmission node may contain transmission configuration information of each of at least one first serving cell of the first transmission node, and the transmission configuration information is configured for communication with the terminal equipment. The at least one secondary serving cell of the terminal equipment may include the at least one first serving cell, and the at least one first serving cell belongs to the first transmission node.

In S210, the control node of the terminal equipment sends the first transmission configuration message to a transmission node to which each secondary serving cell in at least one secondary serving cell of the terminal equipment belongs.

The control node of the terminal equipment may determine the at least one secondary serving cell of the terminal equipment. Specifically, the control node may determine the at least one secondary serving cell of the terminal equipment and the transmission node to which each secondary serving cell in the at least one secondary serving cell belongs. That is, the control node may determine at least one transmission node of the terminal equipment.

As an optional embodiment, each node in a network may broadcast identification information of each cell in its own at least one cell. For example, the node may contain the identification information of the cell in a synchronization signal. Here, the identification information of the cell may be configured to indicate whether the node to which the cell belongs has a capability of serving as a control node or not. For example, a cell identifier of the cell of the control node may belong to a certain preset identifier range. However, the embodiment of the disclosure is not limited. Optionally, the terminal equipment may receive the identification information of each cell in the at least one cell of each of multiple nodes from the node in the network. For example, the terminal equipment may receive the identification information of each cell in multiple cells by cell search. And the terminal equipment may determine the control node and primary serving cell of the terminal equipment according to the received identification information of each cell in the multiple cells. Optionally, the terminal equipment may determine a node type of the node to which the cell belongs according to the received identification information of each cell in the multiple cells, and may initiate a random access flow to the node of which the node type is a first type. In case of successful random access, the node may serve as the control node of the terminal equipment.

Optionally, if nodes to which the multiple cells belong include multiple nodes of which the node types are the first type, the terminal equipment may randomly select a node from the multiple nodes of which the node types are the first type to initiate the random access flow. After the random access flow fails, the terminal equipment randomly select another node for random access. Alternatively, the terminal equipment may determine a target node from the multiple nodes of which the node types are the first type according to a channel state, for example, received signal quality and received signal strength, between the terminal equipment and each node in the multiple nodes of which the node types are the first type and initiate the random access flow to the target node. However, the embodiment of the disclosure is not limited.

Optionally, the terminal equipment may determine the at least one transmission node and at least one secondary serving cell of the terminal equipment according to the received identification information of each cell in the multiple cells. Here, the at least one transmission node may include the nodes of the first type/second type. For example, the terminal equipment may determine the at least one transmission node of the terminal equipment from multiple other nodes according to the channel states between the multiple other nodes, except the control node, in the nodes to which the multiple cells belong and the terminal equipment. At this moment, the terminal equipment may send indication information configured to indicate the at least one secondary serving cell and/or transmission node of the terminal equipment to the control node. Correspondingly, the control node may determine the at least one secondary serving cell of the terminal equipment according to the indication information. Alternatively, the terminal equipment may send a request message to the control node, the request message containing identification information of each candidate secondary serving cell in multiple candidate secondary serving cells. Here, the multiple cells may include the multiple candidate secondary serving cells, and the control node may determine the at least one secondary serving cell of the terminal equipment and the transmission node to which each secondary serving cell belongs from tile multiple candidate secondary serving cells after receiving the message sent by the terminal equipment. Specifically, the terminal equipment may send the message in a process of accessing the control node or after accessing the control node. For example, the terminal equipment contains the identification information of each candidate secondary cell in the multiple candidate secondary serving cells in a random access request. However, the embodiment of the disclosure is not limited.

After determining the at least one secondary serving cell of the terminal equipment and the transmission node to which each secondary serving cell belongs (namely determining the at least one transmission node of the terminal equipment), the control node may send the first transmission configuration message to each transmission node in the at least one transmission node of the terminal equipment. The first transmission configuration message sent by the control node to the transmission node may contain the transmission configuration information of each secondary serving cell in the at least one secondary serving cell belonging to the transmission node, and the transmission configuration information may be configured for communication between the secondary serving cell and the terminal equipment.

Optionally, the transmission configuration information of the secondary serving cell may include information of each of at least one transmission configuration set of the secondary serving cell, and the information of each transmission configuration set may include information of a transmission resource pool corresponding to the transmission configuration set and information of a transmission scheme and/or information of a PHY parameter corresponding to the transmission configuration set. Here, the transmission resource pool may include transmission resources within a certain range, and the transmission resources may include at least one of the following resources: a time-domain resource, a frequency-domain resource, a code-domain resource and a space-domain resource. Specifically, the control node may configure one or more transmission configuration sets for each secondary serving cell, and different transmission configuration sets may correspond to different transmission configurations and may correspond to different service requirements. For example, different transmission configuration sets may correspond to different transmission resource pools, transmission schemes and PHY parameters or any combination of the three. However, the embodiment of the disclosure is not limited.

Optionally, in the embodiment of the disclosure, the transmission scheme may include a duplex manner and/or a multiple access scheme, or may further include another parameter such as a multi-antenna configuration. Here, the duplex manner may specifically be FDD, TDD, Device to Device (D2D) and the like, and the multiple access scheme may specifically be Orthogonal Frequency Division Multiple Access (OFDMA), CDMA or the like. Optionally, the PHY parameter may include at least one of: a subcarrier spacing, a frame structure, a chip rate and a common control channel configuration, or may further include another parameter. However, the embodiment of the disclosure is not limited.

Optionally, the information of the transmission configuration set may further include number information of the transmission configuration set and/or validity period information. Or, the transmission configuration information of the secondary serving cell may further include an activation indication or deactivation indication of each transmission configuration set in the at least one transmission configuration of the secondary serving cell. However, the embodiment of the disclosure is not limited.

Optionally, the first transmission configuration message sent by the control node to the transmission node may further contain identification information of the transmission node. After receiving the first transmission configuration message, the transmission node may determine whether the first transmission configuration message is for it or not according to the identification information of the transmission node in the first transmission configuration message. However, the embodiment of the disclosure is not limited. At this moment, optionally, the control node may configure communication between multiple transmission nodes and the terminal equipment in the same first transmission configuration message and optionally may send the first transmission configuration message in a broadcast form. Correspondingly, the transmission node receiving the first transmission configuration message may determine whether the first transmission configuration message is for it or not according to the identification information of the transmission node in the first transmission configuration message and, when determining that the first transmission configuration message is for it, determine a transmission configuration for communication between it and the terminal equipment according to the information of the at least one transmission configuration set corresponding to the identification information. However, the embodiment of the disclosure is not limited.

In S212, the control node sends a second transmission configuration message to the terminal equipment.

The second transmission configuration message may contain transmission configuration information of each of at least one serving cell of the terminal equipment. Here, the at least one serving cell may specifically be all serving cells of the terminal equipment, that is, the at least one serving cell may include the primary serving cell and at least one secondary serving cell of the terminal equipment; or, the at least one serving cell may only include part of the secondary serving cells of the terminal equipment or only include all the secondary serving cells of the terminal equipment and not include the primary serving cell. However, the embodiment of the disclosure is not limited.

In S214, the transmission node and the terminal equipment may receive the first transmission configuration message and second transmission configuration message sent by the control node respectively and perform communication according to the received transmission configuration messages.

In such a manner, according to the communication method provided by the embodiment of the disclosure, the control node controls the transmission configuration for communication between each secondary serving cell in the at least one secondary serving cell and the terminal equipment, the transmission configuration includes at least one transmission configuration set, and different transmission configuration sets may correspond to different transmission resource pools, transmission schemes, PHY parameters or any combination thereof, so that the at least one transmission configuration set of the at least one secondary serving cell may meet different service requirements of the terminal equipment to further improve overall performance of a system and improve a user experience.

Figure 4:
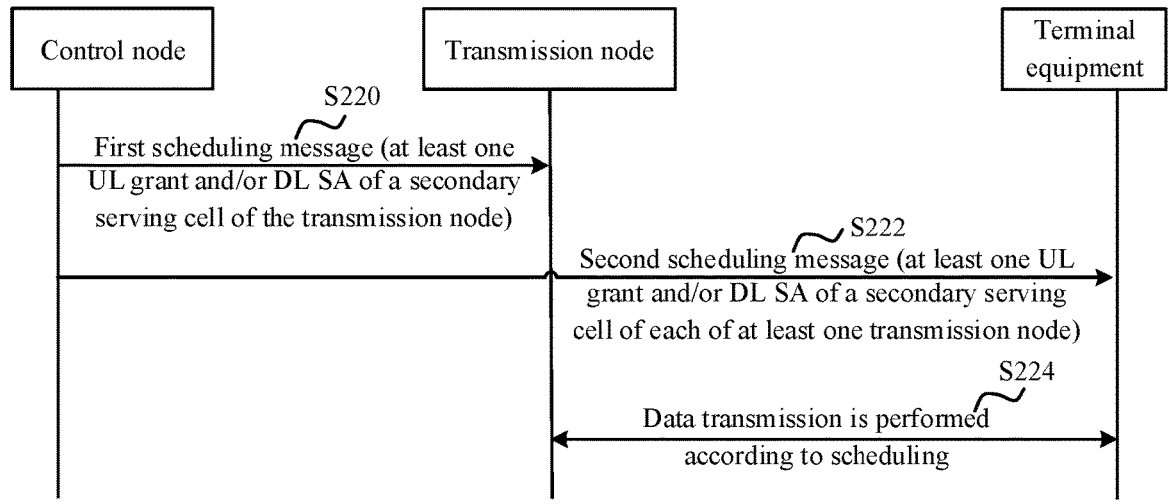
FIG. 4 is another schematic flowchart of a communication method according to an embodiment of the disclosure.

In the embodiment of the disclosure, optionally, the control node and the transmission node may manage their own transmission resources respectively, that is, the transmission node may be responsible for scheduling its own transmission resources. As another optional embodiment, the control node may schedule data transmission between the at least one secondary serving cell of the terminal equipment and the terminal equipment. At this moment, as illustrated in FIG. 4, the method 200 may include S220 to S224. However, the embodiment of the disclosure is not limited. Specifically, the control node of the terminal equipment may send a first scheduling message to the first transmission node in the at least one transmission node of the terminal equipment. Here, the first scheduling message sent to the first transmission node may contain at least one information of at least one UL grant or information of at least one DL SA configured for data transmission between at least one first target serving cell of the first transmission node and the terminal equipment. The first scheduling message is configured to schedule data transmission between the at least one first target serving cell of the first transmission node and the terminal equipment. Here, the at least one secondary serving cell of the terminal equipment may include the at least one first serving cell of the first transmission node, and the at least one first target serving cell may be part of or all the cells in the at least one first serving cell. However, the embodiment of the disclosure is not limited.

In S220, the control node of the terminal equipment sends a first scheduling message to the transmission node to which each target serving cell in the at least one target serving cell of the terminal equipment belongs.

Optionally, the at least one target serving cell may specifically be part of or all the cells in all the serving cells of the terminal equipment and the at least one target serving cell may belong to the at least one transmission node of the terminal equipment. Optionally, the first scheduling message sent by the control node to the transmission node may contain the information of the at least one UL grant and/or the information of the DL SA. Here, the at least one UL grant and/or the at least one DL SA may be configured for data transmission between one or more target serving cells of the transmission node and the terminal equipment. Here, the one or more target serving cells of the transmission node may specifically be part of or all the cells in the serving cells, belonging to the terminal equipment, of the transmission node. However, the embodiment of the disclosure is not limited.

Optionally, the information of the at least one UL grant may include serial number information of the transmission configuration set corresponding to each of the at least one UL grant. Optionally, the information of the at least one DL SA includes serial number information of the transmission configuration set corresponding to each of the at least one DL SA. A number of each transmission configuration set may be predefined or configured in advance by the control node. For example, the control node performs configuration through the first transmission configuration message in the abovementioned embodiment, which will not be limited in the embodiment of the disclosure.

Optionally, the information of the at least one UL grant may include number information of each of the at least one UL grant. Optionally, the information of the at least one DL SA may further include number information of each of the at least one DL SA. Optionally, if the first scheduling message sent by the control node to the transmission node includes multiple UL grants and/or multiple DL SAs, different UL grants and/or DL SAs may correspond to different transmission resources, modulation and coding schemes or the like, and for example, may correspond to different time-frequency resources, code-domain resources, space-domain resources or any combination thereof. The embodiment of the disclosure is not limited.

Optionally, the first scheduling message sent by the control node to the transmission node may further contain the identification information of the transmission node. After receiving the first scheduling message, the transmission node may determine whether the at least one UL grant and/or at least one DL SA scheduled by the first scheduling message are/is for it or not according to the identification information of the transmission node in the first scheduling message. However, the embodiment of the disclosure is not limited. At this moment, optionally, the control node may schedule data transmission between multiple transmission nodes and the terminal equipment in the same first scheduling message and may optionally send the first scheduling message in the broadcast form. Correspondingly, the transmission node receiving the first scheduling message may determine whether the first scheduling message is configured to schedule its data transmission or not according to the identification information of the transmission node in the first scheduling message and, when determining that the first scheduling message is configured to schedule its data transmission, determine its corresponding at least one UL grant and/or DL SA according to the information of the at least one UL grant and/or the information of the DL SA corresponding to the identification information. However, the embodiment of the disclosure is not limited.

Optionally, the first scheduling message further contains identification information of the terminal equipment. After receiving the first scheduling message, the transmission node may determine the terminal equipment corresponding to the at least one UL grant and/or at least one DL SA scheduled by the first scheduling message according to the identification information of the terminal equipment in the first scheduling message. However, the embodiment of the disclosure is not limited.

In S222, the control node sends a second scheduling message to the terminal equipment.

The second scheduling message may contain at least one information of at least one UL grant or information of at least one DL SA of each target serving cell in the at least one target serving cell of the terminal equipment.

In S224, the transmission node and the terminal equipment may receive the first scheduling message and second scheduling message sent by the control node respectively and perform data transmission according to the received scheduling messages.

In such a manner, according to the communication method of the embodiment of the disclosure, the control node sends the first scheduling message to the transmission node, the first scheduling message containing the information of the at least one UL grant and/or the information of the at least one DL SA of each target serving cell in the at least one target serving cell of the transmission node, so that the data transmission efficiency may be improved, and the system performance may be improved.

Figure 5:
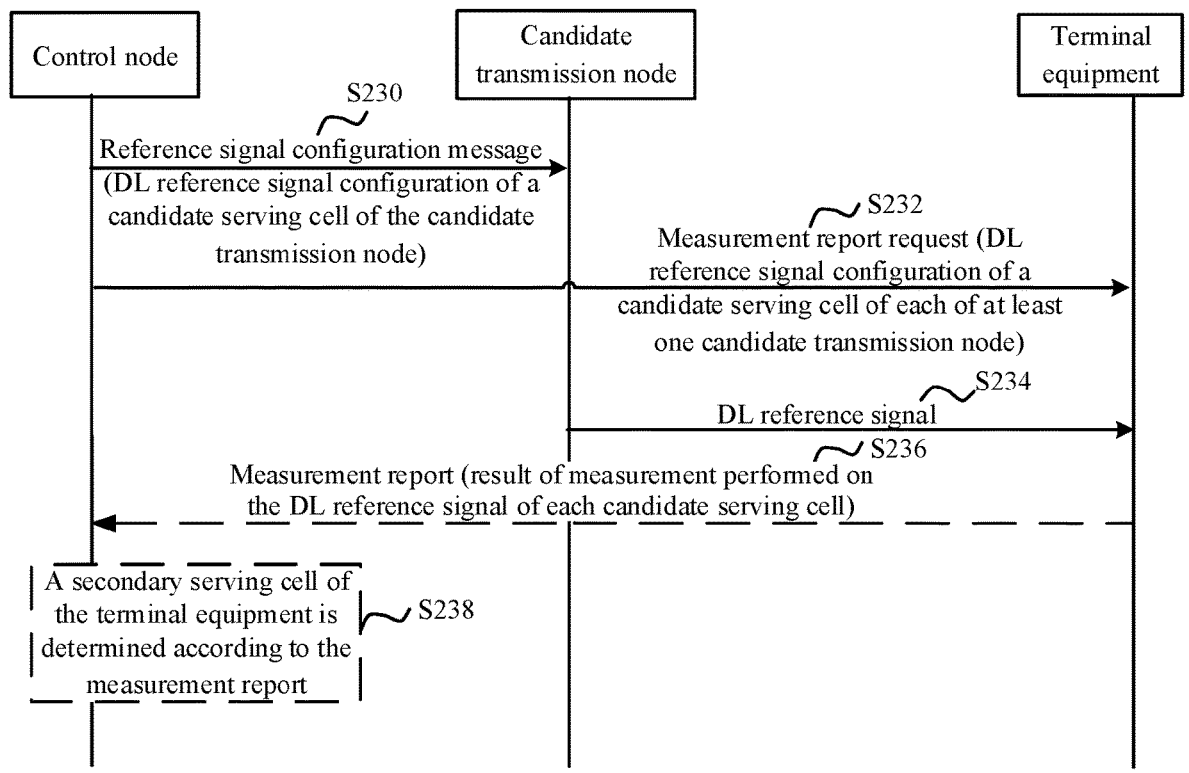
FIG. 5 is another schematic flowchart of a communication method according to an embodiment of the disclosure.

As another optional embodiment, the control node may determine at least one candidate secondary serving cell of the terminal equipment and configure transmission of a downlink reference signal of each candidate secondary serving cell in the at least one candidate secondary serving cell. At this moment, as illustrated in FIG. 5, the method 200 may include S230 to S234. However, the embodiment of the disclosure is not limited. Specifically, the control node of the terminal equipment may send a reference signal configuration message to a first candidate transmission node in at least one candidate transmission node of the terminal equipment. Here, the reference signal configuration message sent to the first candidate transmission node may contain DL reference signal configuration information of each of at least one candidate serving cell belonging to the first candidate transmission node. Here, multiple candidate secondary serving cells of the terminal equipment may include the at least one candidate serving cell belonging to the first candidate transmission node. Optionally, the first candidate transmission node may be a node the same as or different from the first transmission node in the abovementioned embodiment, which will not be limited in the embodiment of the disclosure.

In S230, the control node sends a reference signal configuration message to a transmission node to which each candidate secondary serving cell in multiple candidate secondary serving cells of the terminal equipment belongs.

The control node may determine the multiple candidate secondary serving cells of the terminal equipment. Optionally, the control node may receive a request message sent by the terminal equipment, the request message containing identification information of each candidate secondary serving cell in the multiple candidate secondary serving cells. At this moment, the control node may determine part of or all candidate secondary serving cells in the multiple candidate secondary serving cells as the candidate secondary serving cells of the terminal equipment according to the identification information of each candidate secondary serving cell in the multiple candidate secondary serving cells in the request message. In addition, the control node may further determine the node to which each candidate secondary serving cell belongs according to the identification information of each candidate secondary serving cell in the multiple candidate secondary serving cells of the terminal equipment, namely determining the candidate transmission node to which each candidate secondary serving cell belongs. However, the embodiment of the disclosure is not limited.

After the control node determines the multiple candidate secondary serving cells of the terminal equipment and the candidate transmission node to which each candidate secondary serving cell belongs, the control node may send the reference signal configuration message to each of the at least one candidate transmission node to configure sending of the downlink reference signal of each candidate secondary serving cell in the at least one candidate secondary serving cell of each candidate transmission node.

Optionally, the reference signal configuration message sent by the control node to the candidate transmission node may contain the DL reference signal configuration information of each of the at least one candidate serving cell of the candidate transmission node. Optionally, the DL reference signal configuration information of the candidate serving cell may include at least one of: information of the time-frequency resource, information of the code-domain resource and information of the space-domain resource. Here, the information of the time-frequency resource includes information of at least one physical resource block, that is, a time-frequency resource occupied by the DL reference signal may take a physical resource block as a unit.

In S232, the control node sends a measurement report request to the terminal equipment.

The measurement report request may contain the DL reference signal configuration information of each of the multiple candidate serving cells of the terminal equipment, and the multiple candidate cells belong to the at least one candidate transmission node of the terminal equipment.

In S234, the candidate transmission node receives the reference signal configuration message sent by the control node and sends a DL reference signal according to the reference signal configuration message.

Optionally, the transmission node may determine switching-on or switching-off of DL reference signal transmission according to the reference signal configuration message and send the DL reference signal only when DL reference signal transmission is in an on state.

In addition, the terminal equipment may receive the measurement report request sent by the control node and receive the DL reference signal sent by each of the multiple candidate serving cells according to the measurement report request. Optionally, the terminal equipment may measure the DL reference signal sent by each of the multiple candidate serving cells to obtain a result of measurement performed by each candidate serving cell.

Optionally, in the embodiment of the disclosure, the control node may dynamically configure switching of the DL reference signal of each cell of another node to ensure that the DL reference signal of the cell is in the on state only on some subframes and may be in an off state on other subframes, and the terminal equipment may receive the DL reference signal sent by the cell only on a transmission resource (time-frequency resource, code-domain resource or space-domain resource) corresponding to each cell. However, the embodiment of the disclosure is not limited.

Optionally, the method 200 may further include S236 and S238.

In S236, the terminal equipment sends a measurement report to the control node, the measurement report containing a measurement result obtained by measuring, by the terminal equipment, the DL reference signal sent by each of the multiple candidate serving cells.

In S238, the control node receives the measurement report sent by the terminal equipment and determines the serving cell of the terminal equipment from the multiple candidate serving cells according to the measurement report, namely determining the secondary serving cell of the terminal equipment from the multiple candidate serving cells.

The control node may determine the secondary serving cell of the terminal equipment from the at least one candidate serving cell in the multiple candidate serving cells, and correspondingly, the candidate transmission node to which the candidate serving cell determined as the secondary serving cell of the terminal equipment belongs is the transmission node of the terminal equipment.

In such a manner, according to the communication method of the embodiment of the disclosure, the control node configures the DL reference signal of each of the multiple candidate serving cells of the terminal equipment, so that sending of the DL reference signals of each node may be coordinated, and reduction in interference between the cells and reduction in power consumption of the nodes are facilitated.

It is to be understood that the method 200 may only include the steps of one or more optional embodiments in each optional embodiment, and for example, may include all of the abovementioned steps, which will not be limited in the embodiment of the disclosure.

The communication method provided by the embodiments of the disclosure will be described below in combination with specific examples in more detail. It should be noted that these examples are adopted not to limit the scope of the embodiments of the disclosure but only to help those skilled in the art to better understand the embodiments of the disclosure.

Figure 6:
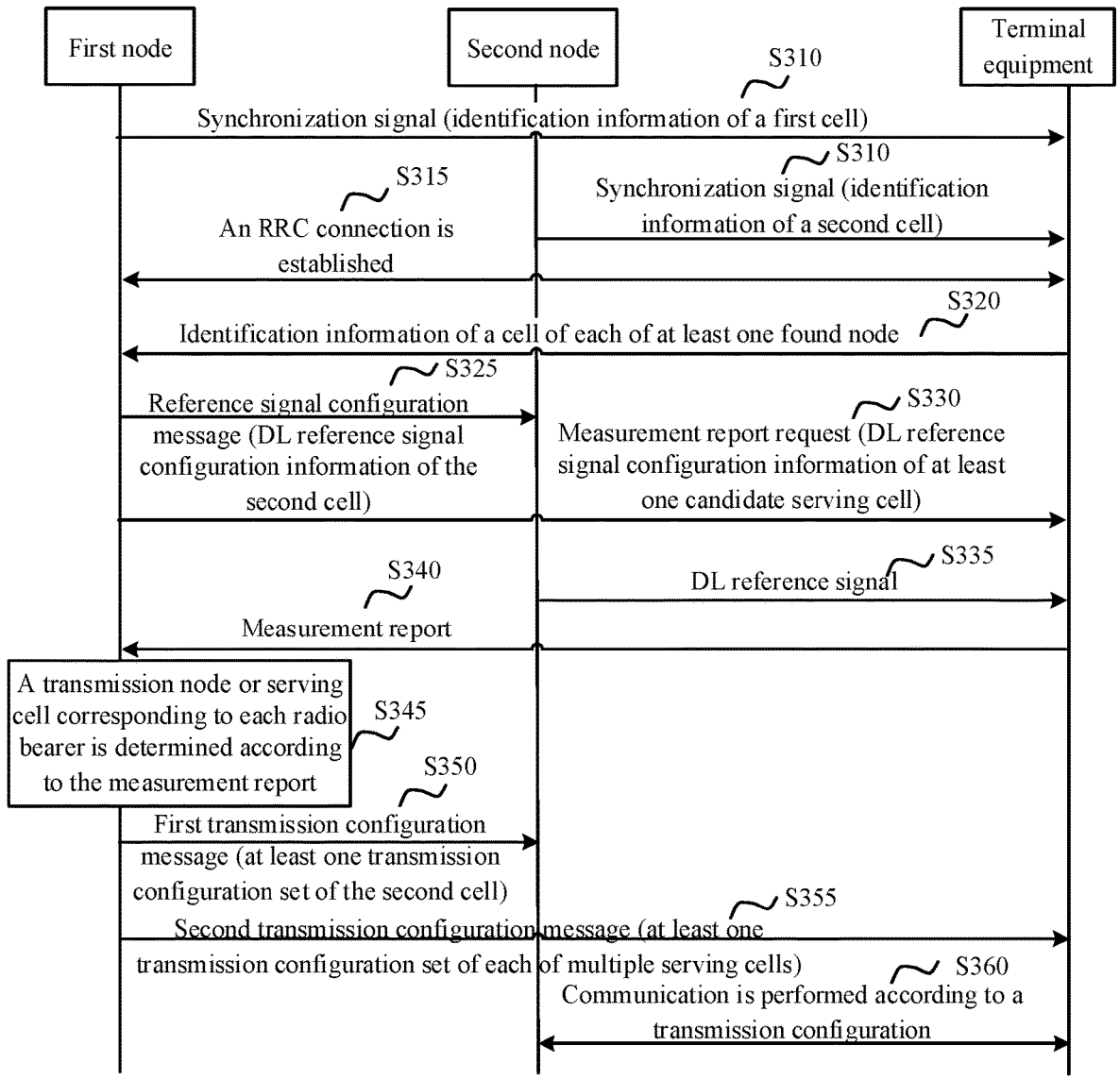
FIG. 6 is a schematic flowchart of a communication method according to another embodiment of the disclosure.

FIG. 6 is a schematic flowchart of a communication method 300 according to another embodiment of the disclosure.

In S310, a first node of which a node type is a first type sends a synchronization signal containing identification information of a first cell, and a second node of which a node type is a second type sends a synchronization signal containing identification information of a second cell.

The first cell belongs to the first node, and the identification information of the first cell may be configured to indicate that the node type of the first node is the first type, that is, the first node has a capability of serving as a control node. The second cell belongs to the second cell, and the identification information of the second cell may be configured to indicate that the node type of the second node is the second type, that is, the second node has no capability of serving as a control node.

Optionally, the identification information of the cell may include a Physical Cell Identifier (PCI) or another identifier, which will not be limited in the embodiment of the disclosure.

In S315, terminal equipment performs cell search and may select the first node from found multiple nodes of the first type for access and establish a connection (for example, an RRC connection) with the first node. At this moment, the first node may serve as a control node of the terminal equipment.

Optionally, the first node may establish at least one radio bearer for the terminal equipment according to a quality of service requirement of the terminal equipment.

In S320, the terminal equipment may report identification information of all or part of found cells to the first node (i.e., the control node).

For example, the terminal equipment may report the identification information of all or part of cells in the other found cells except the first cell, namely reporting identification information of cells of each node in at least one node. Here, identification information of cells of the nodes of the first type and/or cells of nodes of the second type may be included, for example, the identification information of the second cell is included. There are no limits made in the embodiment of the disclosure.

Optionally, the terminal equipment may report the identification information in a process of establishing the RRC connection with the first node or after establishing the RRC connection.

In S325, the first node receives the identification information, reported by the terminal equipment, of a cell of each node in at least one node and may send a reference signal configuration message to part of or all the nodes in the at least one node.

The reference signal configuration message sent by the first node to the other node may include reference signal configuration information of the cell of the other node, for example, at least one of information of a time-frequency resource, information of a code-domain resource or information of a space-domain resource. Here, the time-frequency resource may take a physical resource block as a unit, the information of the code-domain resource may include information of an antenna port, and the information of the code-domain space may include information of a code or sequence adopted for a DL reference signal, so that the other node may switch on and switch off sending of the DL reference signal and regulate a configuration of the DL reference signal. At this moment, the DL reference signal sent by the cell may only occupy one or more physical resource blocks of some special subframes. However, the embodiment of the disclosure is not limited.

In S330, the first node sends a measurement report request to the terminal equipment to request the terminal equipment to measure DL reference signals sent by part of or all the nodes in the at least one node.

For convenient description, part of or all the nodes in the at least one node are called at least one candidate transmission node of the terminal equipment and the cell of the candidate transmission node is called a candidate serving cell hereinafter, that is, the first node sends a DL reference signal configuration message to each of the at least one candidate transmission node of the terminal equipment. Optionally, the at least one candidate transmission node may include the second node.

In S335, the at least one candidate transmission node including the second node receives the reference signal configuration message sent by the first node and sends a DL reference signal according to the reference signal configuration message.

In S340, the terminal equipment receives the measurement report request sent by the first node, measures the DL reference signal sent by the at least one candidate transmission node including the second node according to the measurement report request and may send a measurement result to the first node.

In S345, the first node may receive a measurement report sent by the terminal equipment and may determine one or more transmission nodes of each radio bearer from the at least one candidate transmission node according to the measurement report and a quality of service requirement of each radio bearer in at least one radio bearer of the terminal equipment, namely determining one or more serving cells of each radio beater in at least one candidate serving cell of the terminal equipment.

In S350, the first node sends a first transmission configuration message to part of or all transmission nodes in at least one transmission node of the terminal equipment, the first transmission configuration message containing one or more transmission configuration sets for the terminal equipment.

In S355, the first node sends a second transmission configuration message to the terminal equipment. Here, the second transmission configuration message may contain transmission configuration information of each transmission node in part of or all the transmission nodes in the at least one transmission node for the terminal equipment.

Optionally, the at least one transmission node may include the second node.

Optionally, the transmission configuration information of each transmission node in the second transmission configuration message may include identification information of each transmission node.

In S360, the terminal equipment receives the second transmission configuration message sent by the first node and establishes a connection with each transmission node according to the second transmission configuration message. In addition, the second node receives the first transmission configuration message sent by the first node and establishes a connection with the terminal equipment according to the first transmission configuration message.

Figure 7:
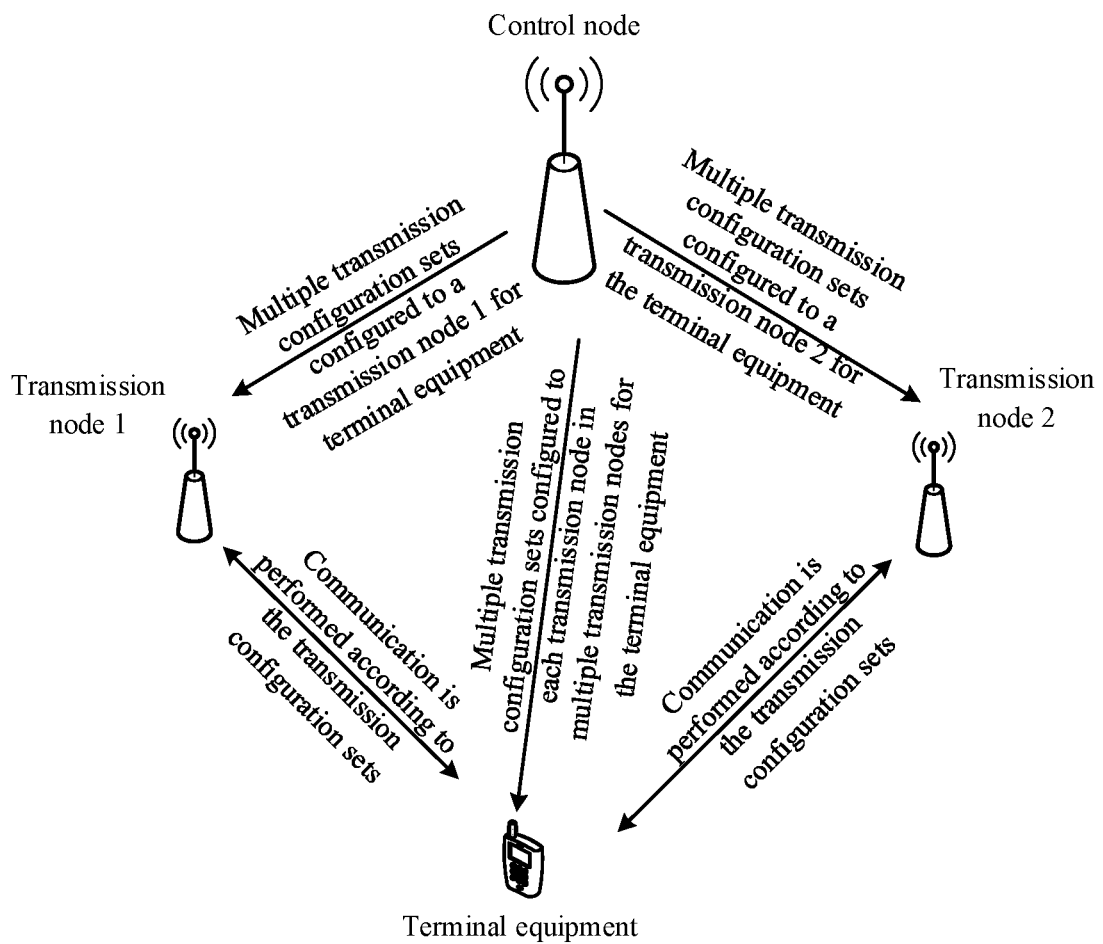
FIG. 7 is a schematic diagram of configuring, by a control node, a communication format in a communication method illustrated in FIG. 6.

As an optional embodiment, as illustrated in FIG. 7, the first node may configure a communication format between each of a transmission node 1 and a transmission node 2 and the terminal equipment. Here, multiple transmission configuration sets may be configured for the transmission node 1 and the transmission node 2 respectively, and a transmission resource pool corresponding to each transmission configuration set may be configured. However, the embodiment of the disclosure is not limited.

Figure 8:
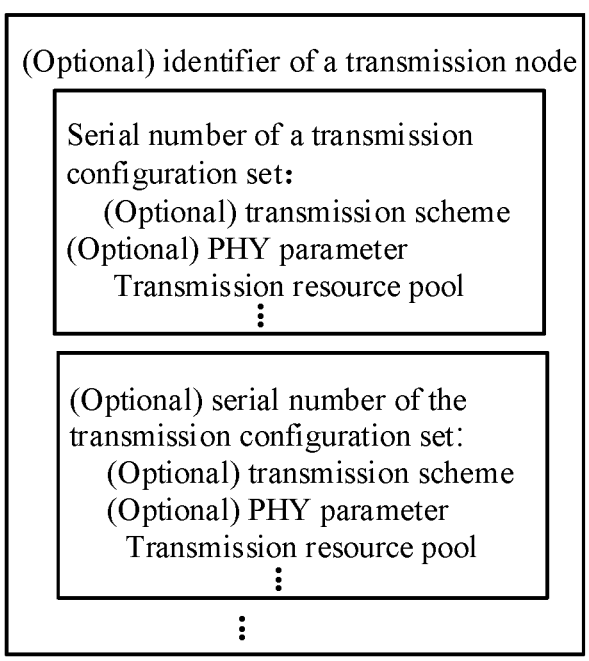
FIG. 8 is a schematic diagram of an example of a first transmission configuration message in a communication method according to an embodiment of the disclosure.
Figure 9:
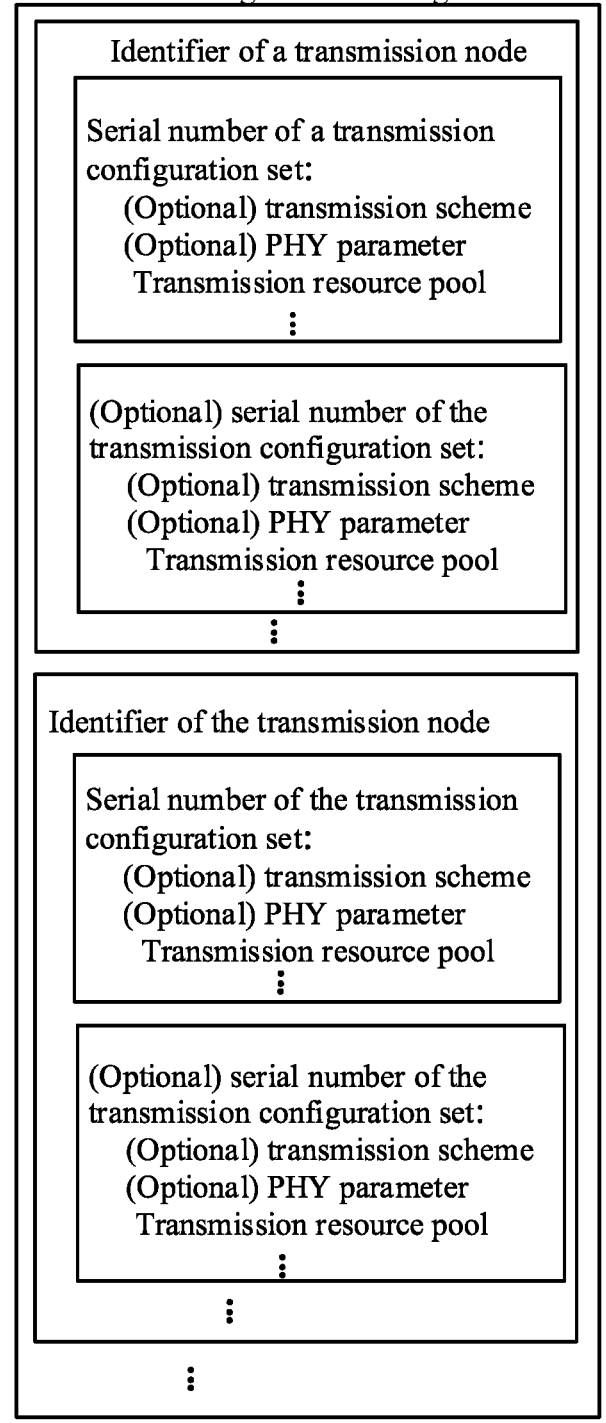
FIG. 9 is a schematic diagram of an example of a second transmission configuration message in a communication method according to an embodiment of the disclosure.

Optionally, in the embodiment of the disclosure, the first transmission configuration message and the second transmission configuration message may be in forms illustrated in FIG. 8 and FIG. 9 respectively. Here, the first transmission configuration message may contain a number of each of at least one transmission configuration set configured for the transmission node, a transmission resource pool, transmission scheme and/or PHY parameter of each transmission configuration set and the like. Optionally, the first transmission configuration message may further contain identification information of the transmission node. The second transmission configuration message may contain the identification information of each transmission node in multiple transmission nodes and information of each of the at least one transmission configuration set of each transmission node or contain the information of each of the at least one transmission configuration set of each serving cell in the multiple serving cells. There are no limits made in the embodiment of the disclosure.

Figure 10:
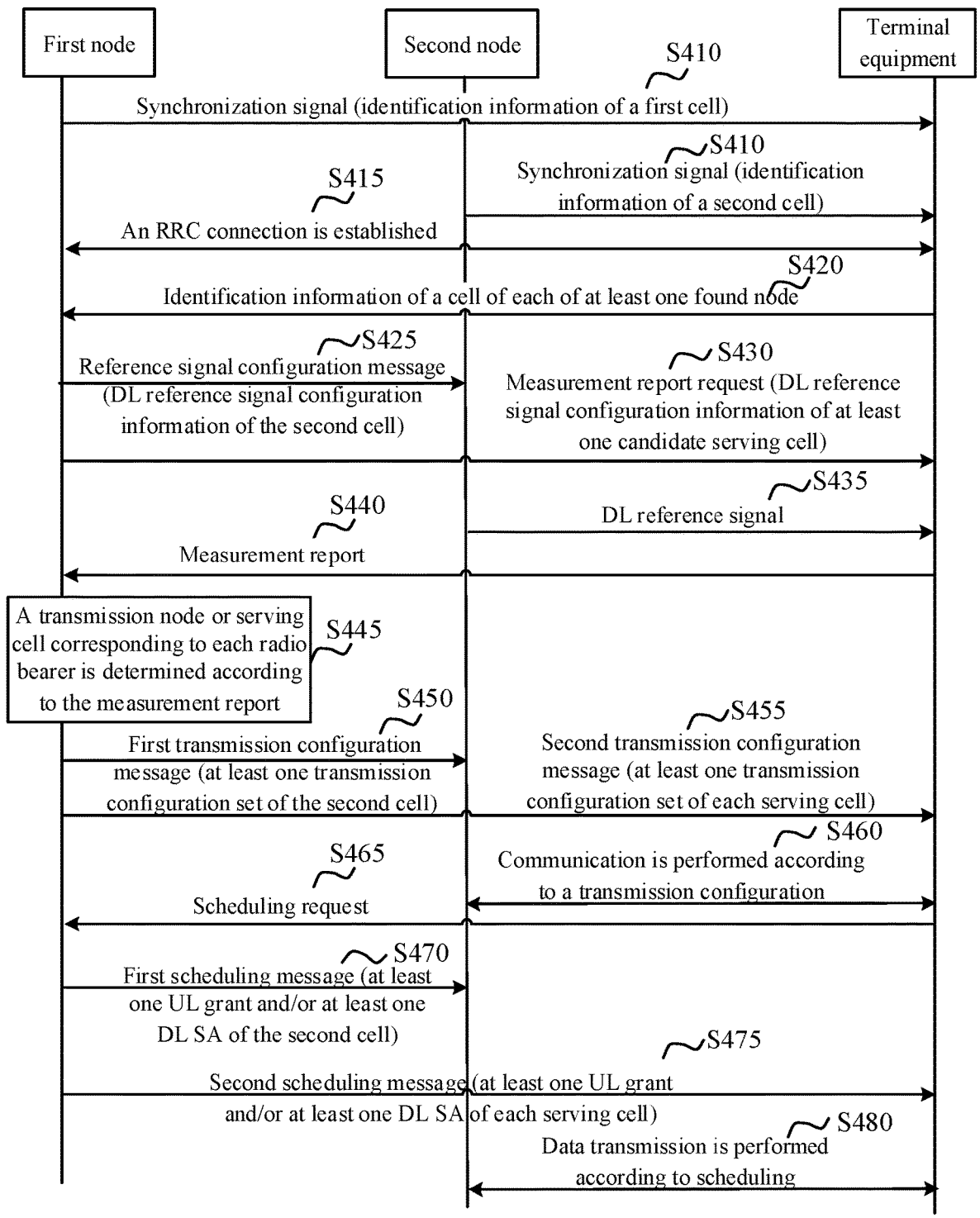
FIG. 10 is a schematic flowchart of a communication method according to another embodiment of the disclosure.

FIG. 10 is a schematic flowchart of a communication method 400 according to another embodiment of the disclosure. Here, S410-S460 are similar to S310-S360 and will not be elaborated herein for simplicity.

In S465, a terminal equipment sends a scheduling request to a first node to request for UL data transmission.

In S470, the first node receives the scheduling request sent by the terminal equipment and may send a first scheduling message to part of or all transmission nodes in at least one transmission node configured for the terminal equipment through a network interface according to the received scheduling request. Here, the first scheduling message may contain resource scheduling information for the terminal equipment.

Optionally, the resource scheduling information of each transmission node may include one or more DL SAs and/or one or more UL grants, and different DL SAs and UL grants may correspond to different transmission resources or transmission formats such as modulation and coding schemes.

Optionally, information of each DL SA or UL grant may include number information of the DL SA or the UL grant.

Optionally, part of or all the transmission nodes in the at least one transmission node may include a second node.

In S475, the first node may send a second scheduling message to the terminal equipment through an air interface. Here, the second scheduling message may contain information of DL SAs and/or UL grants for one or more transmission nodes (or one or more serving cells).

Optionally, the information of the DL SA and/or UL grant for each transmission node may include identification information of the transmission node and the number information of the DL SA and/or the UL grant.

In S480, the terminal equipment may receive the second scheduling message sent by the first node and perform data transmission according to the second scheduling message. In addition, the second node may receive the first scheduling message sent by the first node and perform data transmission with the terminal equipment according to the first scheduling message.

Figure 11:
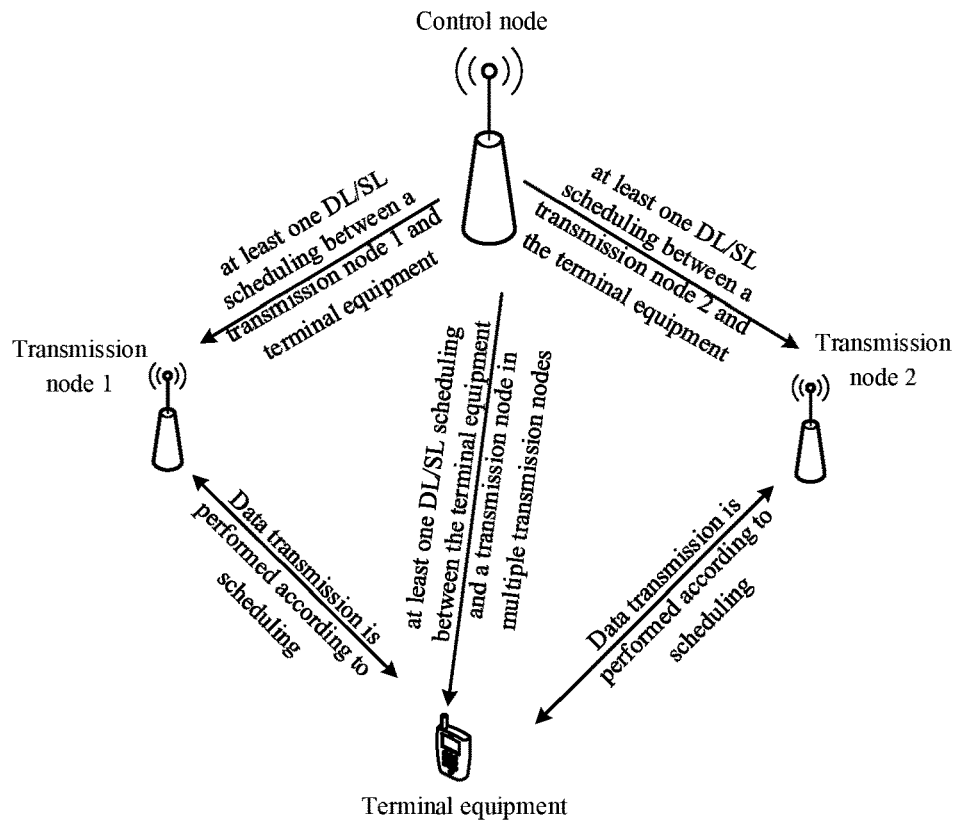
FIG. 11 is a schematic diagram of scheduling, by a control node, data transmission in a communication method illustrated in FIG. 10.

As an optional embodiment, as illustrated in FIG. 11, the first node may schedule data transmission between each of a transmission node 1 and a transmission node 2 and the terminal equipment. Here, at least one UL transmission and/or at least one DL transmission between each of the transmission node 1 and the transmission node 2 and the terminal equipment may be scheduled. However, the embodiment of the disclosure is not limited.

Figure 12:
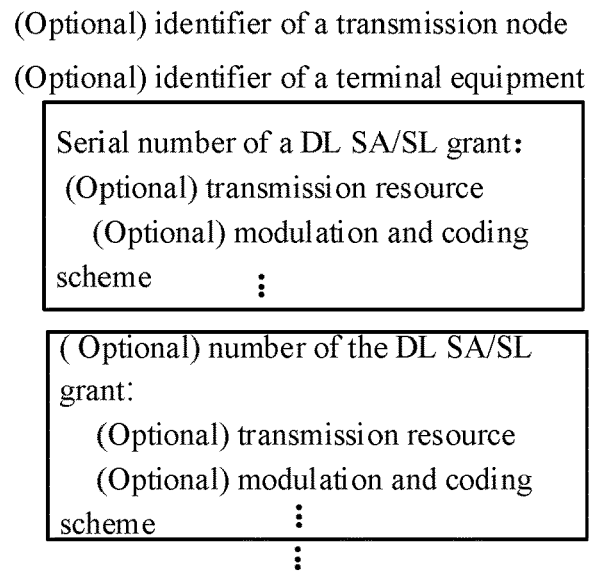
FIG. 12 is a schematic diagram of an example of a first scheduling message in a communication method according to an embodiment of the disclosure.
Figure 13:
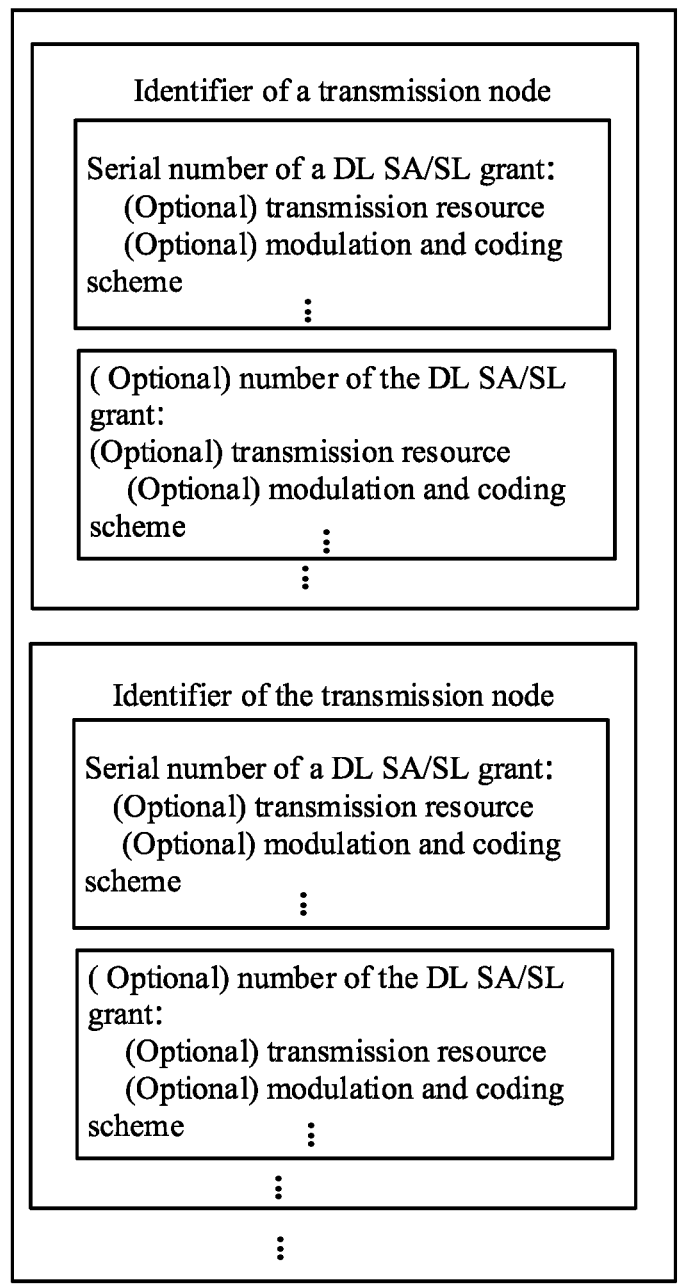
FIG. 13 is a schematic diagram of an example of a second scheduling message in a communication method according to an embodiment of the disclosure.

Optionally, in the embodiment of the disclosure, the first scheduling message and the second scheduling message may be in forms illustrated in FIG. 12 and FIG. 13 respectively. Here, the first scheduling message may contain information about numbers of the at least one UL grant and/or at least one DL SA of the transmission nodes, the transmission resource and/or modulation and coding scheme of each UL grant/DL SA and the like. Optionally, the first scheduling message may further contain identification information of the terminal equipment to indicate the terminal equipment corresponding to the at least one UL grant and/or the at least one DL SA. The second scheduling message may contain the identification information of each transmission node in multiple transmission nodes and the information of the at least one UL grant and/or at least one DL SA of each transmission node or contain information of at least one UL grant and/or at least one DL SA of each of multiple serving cells. There are no limits made in the embodiment of the disclosure.

It should be noted that the examples of FIG. 6 to FIG. 13 are adopted not to limit the scope of the embodiments of the disclosure but only to help those skilled in the art to better understand the embodiments of the disclosure. It is apparent that those skilled in the art may make various equivalent modifications or variations according to the examples of FIG. 6 and FIG. 13, and such modifications or variations shall also fall within the scope of the embodiments of the disclosure.

It is to be understood that magnitudes of sequence numbers of each process are not intended to represent an execution sequence and the execution sequence of each process should be determined by their functions and internal logic and shall not form any limit to an implementation process of the embodiments of the disclosure.

The communication method according to the embodiments of the disclosure is described above in combination with FIG. 3 to FIG. 13 in detail, and a communication device according to the embodiments of the disclosure will be described below in combination with FIG. 14 to FIG. 22 in detail.

Figure 14:
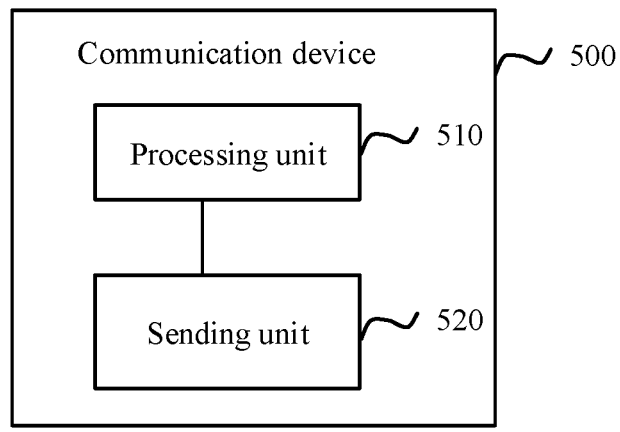
FIG. 14 is a schematic block diagram of a communication device according to an embodiment of the disclosure.

FIG. 14 is a schematic block diagram of a communication device 500 according to an embodiment of the disclosure. The communication device 500 includes a processing unit 510 and a sending unit 520 coupled to the processing unit 510.

In an optional embodiment, the processing unit 510 is configured to generate a first transmission configuration message. Here, the first transmission configuration message contains transmission configuration information of each of at least one first serving cell of a terminal equipment. The transmission configuration information of each first serving cell includes transmission scheme information and/or PHY parameter information of each of at least one transmission configuration set of the first serving cell, and transmission resource pool information corresponding to the transmission scheme information and/or the PHY parameter information. The sending unit 520 is configured to send the first transmission configuration message generated by the processing unit 510 to the first transmission node.

Optionally, the PHY parameter information includes at least one of a subcarrier spacing, a frame structure, a chip rate or a common control channel configuration.

Optionally, the transmission scheme information includes at least one of a duplex manner or a multiple access scheme.

Optionally, the transmission resource pool information includes at least one of a time-domain resource, a frequency-domain resource, a code-domain resource or a space-domain resource.

Optionally, the transmission configuration information of each first serving cell further includes serial number information of each of the at least one transmission configuration set of the first serving cell.

Optionally, the transmission configuration information of each first serving cell further includes an activation indication, deactivation indication or validity period information corresponding to each of the at least one transmission configuration set of the first serving cell.

Optionally, the sending unit 520 is further configured to send a second transmission configuration message to the terminal equipment. The second transmission configuration message contains transmission configuration information of each of at least one serving cell of the terminal equipment. Here, the at least one serving cell includes the at least one first serving cell.

Optionally, the sending unit 520 is further configured to send a first scheduling message to the first transmission node. The first scheduling message contains at least one information of at least one UL grant or information of at least one DL SA configured to schedule data transmission between each of at least one first target serving cell and the terminal equipment. The at least one first serving cell includes the at least one first target serving cell.

Optionally, a control node sends a second scheduling message to the terminal equipment. The second scheduling message contains at least one information of at least one UL grant or information of at least one DL SA configured to schedule data transmission between each of in at least one target serving cell of the terminal equipment and the terminal equipment.

Optionally, the information of the at least one UL grant includes serial number information of the transmission configuration set corresponding to each of the at least one UL grant.

Optionally, the information of the at least one DL SA includes serial number information of the transmission configuration set corresponding to each of the at least one DL SA.

Optionally, the first scheduling message further contains identification information of the terminal equipment.

Optionally, the sending unit 520 is further configured to, before the processing unit 510 generates the first transmission configuration message, send a reference signal configuration message to each of at least one candidate transmission node of the terminal equipment. The reference signal configuration message contains DL reference signal configuration information of each of at least one candidate serving cell of each candidate transmission node. The at least one candidate transmission node includes the first transmission node.

Optionally, the sending unit 520 is further configured to send a measurement report request to the terminal equipment. The measurement report request contains the DL reference signal configuration information of each of multiple candidate serving cells of the terminal equipment. Here, the multiple candidate serving cells belong to the at least one candidate transmission node of the terminal equipment.

At this moment, the device 500 further includes a first receiving unit, configured to receive a measurement report sent by the terminal equipment according to the measurement report request sent by the sending unit 520. The measurement report contains a result of measurement performed by the terminal equipment on a DL reference signal sent by each of the multiple candidate serving cells.

Correspondingly, the processing unit 510 is further configured to determine the at least one serving cell of the terminal equipment from the multiple candidate serving cells according to the measurement report received by the first receiving unit.

Optionally, the DL reference signal configuration information includes at least one of: information of a time-frequency resource, information of the code-domain resource or information of the space-domain resource. Here, the information of the time-frequency resource includes information of at least one physical resource block.

Optionally, the device 500 further includes a second receiving unit, configured to, before the sending unit 520 sends the reference signal configuration message to each of the at least one candidate transmission node of the terminal equipment, receive a request message sent by the terminal equipment. The request message contains identification information of each of the multiple candidate serving cells of the terminal equipment. The identification information of each candidate serving cell indicates that a node type of the candidate transmission node to which the candidate serving cell belongs is a first type or a second type. Each node of the first type has a capability of serving as a control node and each node of the second type has no capability of serving as a control node.

Correspondingly, the sending unit 520 is specifically configured to send the reference signal configuration message to each of the at least one candidate transmission node of the terminal equipment according to the request message received by the second receiving unit.

Optionally, the sending unit 520 is further configured to, before the processing unit 510 generates the first transmission configuration message, send identification information of a cell of the control node to the terminal equipment. The identification information of the cell of the control node indicates that the control node has the capability of serving as a control node.

In another optional embodiment, the processing unit 510 is configured to generate a reference signal configuration message. The reference signal configuration message contains DL reference signal configuration information of each of at least one first candidate serving cell of the terminal equipment. The DL reference signal configuration information includes at least one of: information of a time-frequency resource, information of a code-domain resource or information of a space-domain resource. The information of the time-frequency resource includes information of at least one physical resource block and the at least one first candidate serving cell belonging to a first candidate transmission node. The sending unit 520 is configured to send the reference signal configuration message generated by the processing unit 510 to the first candidate transmission node.

Optionally, the sending unit 520 is further configured to send a measurement report request to the terminal equipment. The measurement report request contains DL reference signal configuration information of each of at least one candidate serving cell of the terminal equipment. Here, the at least one candidate serving cell includes the at least one first candidate serving cell.

At this moment, the device 500 further includes a receiving unit, configured to receive a measurement report sent by the terminal equipment according to the measurement report request sent by the sending unit 520. The measurement report containing a result of measurement performed by the terminal equipment on a DL reference signal sent by each of the at least one candidate serving cell.

Correspondingly, the processing unit 510 is further configured to determine the at least one serving cell of the terminal equipment from the at least one candidate serving cell according to the measurement report received by the receiving unit.

Optionally, the receiving unit is further configured to, before the sending unit 520 sends the measurement report request to the terminal equipment, receive identification information of each of the at least one candidate serving cell sent by the terminal equipment. The identification information of each candidate serving cell indicates that a node type of a candidate transmission node to which the candidate serving cell belongs is a first type or a second type. a node of the first type has a capability of serving as a control node and a node of the second type has no capability of serving as a control node.

Correspondingly, the sending unit 520 is specifically configured to send the measurement report request to the terminal equipment according to the identification information, received by the receiving unit, of each of the at least one candidate serving cell.

Optionally, the sending unit 520 is further configured to, before the processing unit 510 generates the reference signal configuration message, send identification information of a cell of the control node to the terminal equipment. The identification information of the cell of the control node indicates that the control node has the capability of serving as a control node.

Optionally, the sending unit 520 is further configured to send a first scheduling message to the first candidate transmission node. The first scheduling message contains at least one information of at least one UL grant or information of at least one DL SA configured to schedule data transmission between each of at least one first target serving cell of the terminal equipment and the terminal equipment. Here, the at least one first candidate serving cell includes the at least one first target serving cell.

Optionally, the sending unit 520 is further configured to send a second scheduling message to the terminal equipment. The second scheduling message contains at least one information of at least one UL grant or information of at least one DL SA configured to schedule data transmission between each of in at least one target serving cell of the terminal equipment and the terminal equipment.

Optionally, the first scheduling message further contains identification information of the terminal equipment.

In another optional embodiment, the processing unit 510 may be configured to generate a first scheduling message. The first scheduling message contains at least one information of at least one UL grant or information of at least one DL SA configured to schedule data transmission between at least one first target serving cell and the terminal equipment. The at least one first target serving cell belongs to a first transmission node. And the sending unit 520 may be configured to send the first scheduling message generated by the processing unit 510 to the first transmission node.

Optionally, the first scheduling message further contains identification information of the terminal equipment.

Optionally, the sending unit 520 is further configured to send a second scheduling message to the terminal equipment. The second scheduling message contains at least one information of at least one UL grant or information of at least one DL SA configured to schedule data transmission between each of in at least one target serving cell and the terminal equipment. Here, the at least one target serving cell includes the at least one first target serving cell.

It is to be understood that the device 500 described herein is embodied in form of functional unit. In an optional example, those skilled in the art may know that the device 500 may specifically be the control node in the abovementioned embodiments and may be configured to execute each flow and/or step corresponding to the control node in the abovementioned method embodiments, which will not be elaborated herein for avoiding repetitions.

Figure 15:
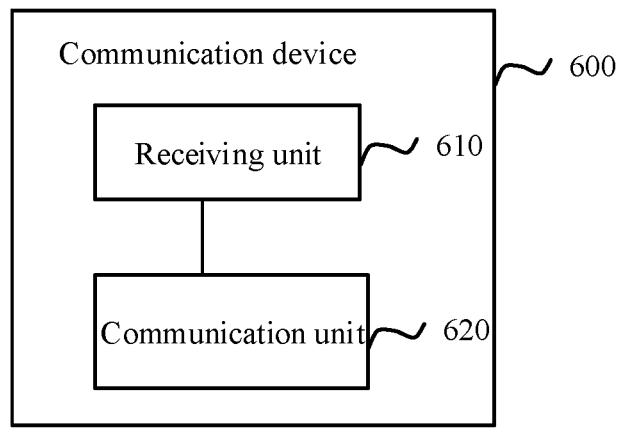
FIG. 15 is a schematic block diagram of a communication device according to another embodiment of the disclosure.

FIG. 15 is a schematic block diagram of a communication device 600 according to another embodiment of the disclosure. The communication device 600 includes a receiving unit 610 and a communication unit 620.

The receiving unit 610 is configured to receive a first transmission configuration message sent by a control node. The first transmission configuration message contains transmission configuration information of each of at least one first serving cell of the device. The transmission configuration information of each first serving cell includes transmission scheme information and/or PHY parameter information of each of at least one transmission configuration set of the first serving cell, and transmission resource pool information corresponding to the transmission scheme information and/or the PHY parameter information.

The communication unit 620 is configured to perform communication with a terminal equipment through the at least one first serving cell according to the first transmission configuration message received by the receiving unit 610.

For example, the communication unit 620 may establish a connection, for example, a data-plane connection, with the terminal equipment through the at least one first serving cell according to the first transmission configuration message.

Optionally, the PHY parameter information includes at least one of a subcarrier spacing, a frame structure, a chip rate or a common control channel configuration.

Optionally, the transmission scheme information includes at least one of a duplex manner or a multiple access scheme.

Optionally, the transmission resource pool information includes at least one of a time-domain resource, a frequency-domain resource, a code-domain resource or a space-domain resource.

Optionally, the transmission configuration information of each first serving cell further includes serial number information of each of the at least one transmission configuration set of the first serving cell.

Optionally, the transmission configuration information of each first serving cell further includes an activation indication, deactivation indication or validity period information corresponding to each of the at least one transmission configuration set of the first serving cell.

Optionally, the receiving unit 610 is further configured to receive a first scheduling message sent by the control node. The first scheduling message contains at least one information of at least one UL grant or information of at least one DL SA configured to schedule data transmission between each of at least one first target serving cell and the terminal equipment. The at least one first serving cell includes the at least one first target serving cell.

At this moment, the device 600 further includes a data transmission unit, configured to perform data transmission with the terminal equipment through the at least one first target serving cell according to the first scheduling message received by the receiving unit 610.

Optionally, the information of the at least one UL grant includes serial number information of the transmission configuration set corresponding to each of the at least one UL grant.

Optionally, the information of the at least one DL SA includes serial number information of the transmission configuration set corresponding to each of the at least one DL SA.

Optionally, the first scheduling message further contains identification information of the terminal equipment.

Optionally, the receiving unit 610 is further configured to, before the first transmission configuration message sent by the control node is received, receive a reference signal configuration message sent by the control node. The reference signal configuration message contains DL reference signal configuration information of at least one candidate serving cell of the first transmission node. Here, the at least one candidate serving cell of the first transmission node includes the at least one first serving cell.

Correspondingly, the device 600 further includes a sending unit, configured to send a DL reference signal through the at least one candidate serving cell according to the reference signal configuration message received by the receiving unit 610.

Optionally, the DL reference signal configuration information includes at least one of: information of a time-frequency resource, information of the code-domain resource or information of the space-domain resource. Here, the information of the time-frequency resource includes information of at least one physical resource block.

Optionally, the sending unit is further configured to, before the receiving unit 610 receives the reference signal configuration message sent by the control node, send identification information of each of the at least one candidate serving cell of the first transmission node to the terminal equipment. The identification information of each candidate serving cell indicates that a node type of the first transmission node is a first type or a second type. A node of the first type has a capability of serving as a control node and a node of the second type has no capability of serving as a control node.

It is to be understood that the device 600 described herein is embodied in form of functional unit. In an optional example, those skilled in the art may know that the device 600 may specifically be the transmission node in the abovementioned embodiments and may be configured to execute each flow and/or step corresponding to the transmission node in the abovementioned method embodiments, which will not be elaborated herein for avoiding repetitions.

Figure 16:
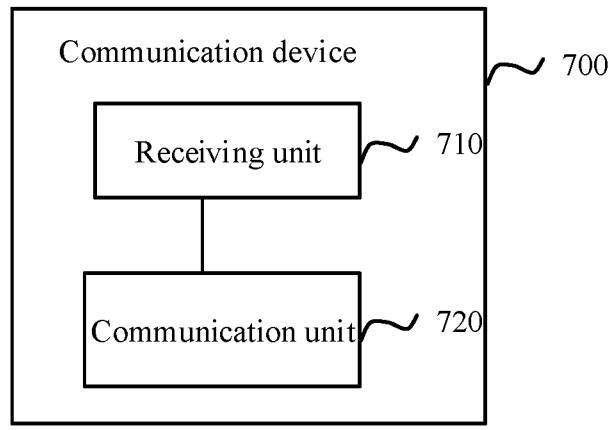
FIG. 16 is a schematic block diagram of a communication device according to another embodiment of the disclosure.

FIG. 16 is a communication device 700 according to another embodiment of the disclosure. The communication device 700 includes a receiving unit 710 and a communication unit 720.

The receiving unit 710 is configured to receive a second transmission configuration message sent by a control node: The second transmission configuration message contains transmission configuration information of each of at least one serving cell of a terminal equipment and the transmission configuration information of each serving cell including transmission scheme information and/or PHY parameter information of each of at least one transmission configuration set of the serving cell and transmission resource pool information corresponding to the transmission scheme information and/or the PHY parameter information.

The communication unit 720 is configured to perform communication with the at least one serving cell according to the second transmission configuration message received by the receiving unit 710.

Optionally, the receiving unit 710 is further configured to receive a second scheduling message sent by the control node. The second scheduling message contains at least one information of at least one UL grant or information of at least one DL SA configured to schedule data transmission between each of in at least one target serving cell and the terminal equipment. The at least one serving cell of the terminal equipment includes the at least one target serving cell.

Correspondingly, the device 700 further includes a data transmission unit.

The data transmission unit is configured to perform data transmission with the at least one target serving cell according to the second scheduling message received by the receiving unit 710.

Optionally, the receiving unit 710 is further configured to, before the second transmission configuration message sent by the control node is received, receive a measurement report request sent by the control node. The measurement report request contains DL reference signal configuration information of each of at least one candidate serving cell of the terminal equipment. The at least one candidate serving cell of the terminal equipment includes the at least one serving cell; and Correspondingly, the device 700 further includes a measurement unit, configured to measure a DL reference signal sent by each of the at least one candidate serving cell according to the measurement report request received by the receiving unit 710.

Optionally, the DL reference signal configuration information includes at least one of: information of a time-frequency resource, information of a code-domain resource or information of a space-domain resource. Here, the information of the time-frequency resource includes information of at least one physical resource block.

Optionally, the receiving unit 710 is further configured to, before the measurement report request sent by the control node is received, receive identification information of at least one cell of each of multiple nodes from the node. Here, the identification information of each cell indicates that a node type of the node to which the cell belongs is a first type or a second type. A node of the first type has a capability of serving as a control node, a node of the second type has no capability of serving as a control node, and the multiple nodes include the control node and at least one transmission node.

Correspondingly, the device 700 further includes a processing unit, configured to determine the control node and the at least one transmission node according to the identification information, received by the receiving unit 710, of each cell in multiple cells.

It is to be understood that the device 700 described herein is embodied in form of functional unit. In an optional example, those skilled in the art may know that the device 700 may specifically be the terminal equipment in the abovementioned embodiments and may be configured to execute each flow and/or step corresponding to the terminal equipment in the abovementioned method embodiments, which will not be elaborated herein for avoiding repetitions.

Figure 17:
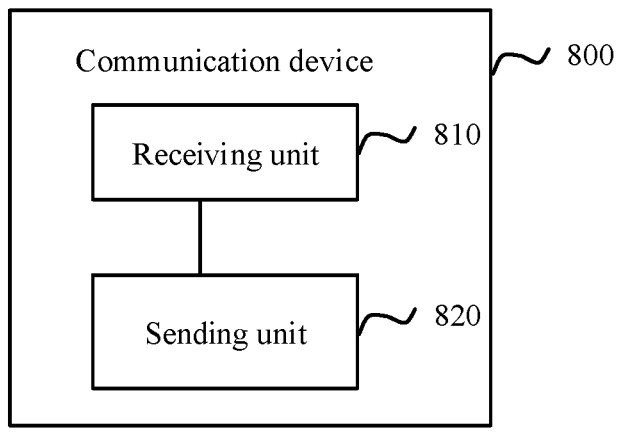
FIG. 17 is a schematic block diagram of a communication device according to another embodiment of the disclosure.

FIG. 17 is a communication device 800 according to another embodiment of the disclosure. The communication device 800 includes a receiving unit 810 and a sending unit 820.

The receiving unit 810 is configured to receive a reference signal configuration message sent by a control node, the reference signal configuration message containing DL reference signal configuration information of each of at least one first candidate serving cell of a terminal equipment. The DL reference signal configuration information includes at least one of: information of a time-frequency resource, information of a code-domain resource or information of a space-domain resource. The information of the time-frequency resource includes information of at least one physical resource block. The at least one first candidate serving cell belongs to the device.

The sending unit 820 is configured to send a DL reference signal through the at least one first candidate serving cell according to the reference signal configuration message received by the receiving unit 810.

Optionally, the sending unit 820 is further configured to, before the receiving unit 810 receives the reference signal configuration message sent by the control node, send identification information of each of the at least one first candidate serving cell to the terminal equipment. The identification information of each first candidate serving cell indicates that a node type of the first node is a first type or a second type. A node of the first type has a capability of serving as a control node and a node of the second type has no capability of serving as a control node.

Optionally, the receiving unit 810 is further configured to receive a first scheduling message sent by the control node. The first scheduling message contains at least one information of at least one UL grant or information of at least one DL SA configured to schedule data transmission between each of at least one first target serving cell and the terminal equipment. The at least one first candidate serving cell includes the at least one first target serving cell.

Correspondingly, the device 800 further includes a data transmission unit, configured to perform data transmission with the terminal equipment through the at least one first target serving cell according to the first scheduling message received by the receiving unit 810.

Optionally, the information of the at least one UL grant includes serial number information of a transmission configuration set corresponding to each of the at least one UL grant.

Optionally, the information of the at least one DL SA includes serial number information of a transmission configuration set corresponding to each of the at least one DL SA.

Optionally, the first scheduling message further contains identification information of the terminal equipment.

It is to be understood that the device 800 described herein is embodied in form of functional unit. In an optional example, those skilled in the art may know that the device 800 may specifically be the transmission node in the abovementioned embodiments and may be configured to execute each flow and/or step corresponding to the transmission node in the abovementioned method embodiments, which will not be elaborated herein for avoiding repetitions.

Figure 18:
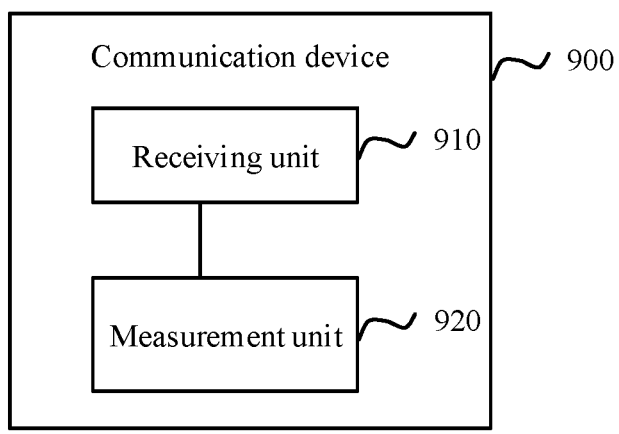
FIG. 18 is a schematic block diagram of a communication device according to another embodiment of the disclosure.

FIG. 18 is a communication device 900 according to another embodiment of the disclosure. The communication device 900 includes a receiving unit 910 and a measurement 920.

The receiving unit 910 is configured to receive a measurement report request sent by a control node. The measurement report request contains DL reference signal configuration information of each of at least one candidate serving cell of a terminal equipment. Here, the DL reference signal configuration information includes at least one of: information of a time-frequency resource, information of a code-domain resource or information of a space-domain resource. The information of the time-frequency resource includes information of at least one physical resource block.

The measurement unit 920 is configured to measure a DL reference signal sent by each of the at least one candidate serving cell according to the measurement report request received by the receiving unit 910.

Optionally, the receiving unit 910 is further configured to, before the measurement report request sent by the control node is received, receive identification information of each of the at least one candidate serving cell. Here, the identification information of each candidate serving cell indicates that a node type of each candidate serving cell is a first type or a second type, a node of the first type has a capability of serving as a control node, and a node of the second type has no capability of serving as a control node.

At this moment, the device 900 further includes a sending unit, configured to send a request message to the control node. The request message contains the identification information, received by the receiving unit 910, of each of the at least one candidate serving cell.

Correspondingly, the receiving unit 910 is further configured to receive the measurement report request sent by the control node according to the request message sent by the sending unit.

Optionally, the receiving unit 910 is further configured to receive a second scheduling message sent by the control node. The second scheduling message contains at least one information of at least one UL grant or information of at least one DL SA configured to schedule data transmission between at least one target serving cell and the terminal equipment. Here, the at least one candidate serving cell includes the at least one target serving cell.

Optionally, the information of the at least one UL grant includes serial number information of a transmission configuration set corresponding to each of the at least one UL grant.

Optionally, the information of the at least one DL SA includes serial number information of a transmission configuration set corresponding to each of the at least one DL SA.

It is to be understood that the device 900 described herein is embodied in form of functional unit. In an optional example, those skilled in the art may know that the device 900 may specifically be the terminal equipment in the abovementioned embodiments and may be configured to execute each flow and/or step corresponding to the terminal equipment in the abovementioned method embodiments, which will not be elaborated herein for avoiding repetitions.

Figure 19:
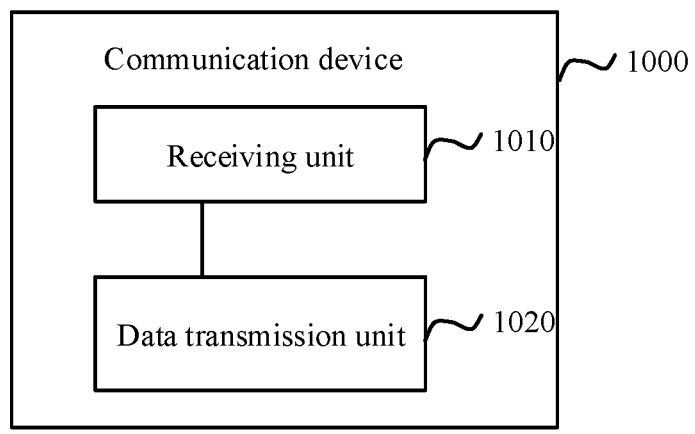
FIG. 19 is a schematic block diagram of a communication device according to another embodiment of the disclosure.

FIG. 19 is a communication device 1000 according to another embodiment of the disclosure. The communication device 1000 includes a receiving unit 1010 and a data transmission unit 1020.

The receiving unit 1010 is configured to receive a first scheduling message sent by a control node. The first scheduling message contains at least one information of at least one UL grant or information of at least one DL SA configured to schedule data transmission between each of at least one first target serving cell of the device and a terminal equipment.

The data transmission unit 1020 is configured to perform data transmission with the terminal equipment through the at least one first target serving cell according to the first scheduling message received by the receiving unit 1010.

It is to be understood that the device 1000 described herein is embodied in form of functional unit. In an optional example, those skilled in the art may know that the device 1000 may specifically be the transmission node in the abovementioned embodiments and may be configured to execute each flow and/or step corresponding to the transmission node in the abovementioned method embodiments, which will not be elaborated herein for avoiding repetitions.

It is to be understood that term "unit" in the disclosure may refer to an Application Specific Integrated Circuit (ASIC), an electronic circuit, a processor (for example, a shared processor, a dedicated processor or a group processor) and memory configured to execute one or more software or firmware programs, a merged logic circuit and/or another proper component supporting the described functions.

Figure 20:
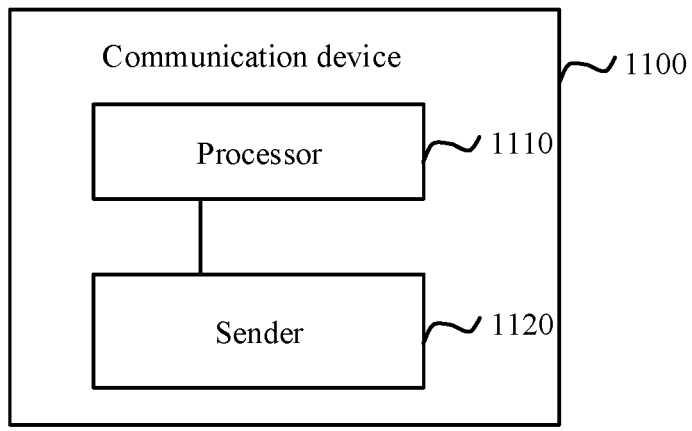
FIG. 20 is a schematic block diagram of a communication device according to another embodiment of the disclosure.

FIG. 20 is a schematic block diagram of a communication device 1100 according to an embodiment of the disclosure. The communication device 1100 includes a processor 1110 and a sensor 1120 coupled to the processor 1110.

In an optional embodiment, the processor 1110 is configured to generate a first transmission configuration message. Here, the first transmission configuration message contains transmission configuration information of each of at least one first serving cell of a terminal equipment and the transmission configuration information of each first serving cell includes transmission scheme information and/or PHY parameter information of each of at least one transmission configuration set of the first serving cell, and transmission resource pool information corresponding to the transmission scheme information and/or the PHY parameter information. The sender 1120 is configured to send the first transmission configuration message generated by the processor 1110 to the first transmission node.

Optionally, the PHY parameter information includes at least one of a subcarrier spacing, a frame structure, a chip rate or a common control channel configuration.

Optionally, the transmission scheme information includes at least one of a duplex manner or a multiple access scheme.

Optionally, the transmission resource pool information includes at least one of a time-domain resource, a frequency-domain resource, a code-domain resource or a space-domain resource.

Optionally, the transmission configuration information of each first serving cell further includes serial number information of each of the at least one transmission configuration set of the first serving cell.

Optionally, the transmission configuration information of each first serving cell further includes an activation indication, deactivation indication or validity period information corresponding to each of the at least one transmission configuration set of the first serving cell.

Optionally, the sender 1120 is further configured to send a second transmission configuration message to the terminal equipment, the second transmission configuration message containing transmission configuration information of each of at least one serving cell of the terminal equipment. Here, the at least one serving cell includes the at least one first serving cell.

Optionally, the sender 1120 is further configured to send a first scheduling message to the first transmission node. The first scheduling message contains at least one information of at least one UL grant or information of at least one DL SA configured to schedule data transmission between each of at least one first target serving cell and the terminal equipment. The at least one first serving cell includes the at least one first target serving cell.

Optionally, a control node sends a second scheduling message to the terminal equipment. The second scheduling message contains at least one information of at least one UL grant or information of at least one DL SA configured to schedule data transmission between each of in at least one target serving cell of the terminal equipment and the terminal equipment.

Optionally, the information of the at least one UL grant includes serial number information of the transmission configuration set corresponding to each of the at least one UL grant.

Optionally, the information of the at least one DL SA includes serial number information of the transmission configuration set corresponding to each of the at least one DL SA.

Optionally, the first scheduling message further contains identification information of the terminal equipment.

Optionally, the sender 1120 is further configured to, before the processor 1110 generates the first transmission configuration message, send a reference signal configuration message to each of at least one candidate transmission node of the terminal equipment. The reference signal configuration message contains DL reference signal configuration information of each of at least one candidate serving cell of each candidate transmission node. The at least one candidate transmission node includes the first transmission node.

Optionally, the sender 1120 is further configured to send a measurement report request to the terminal equipment. The measurement report request contains the DL reference signal configuration information of each of multiple candidate serving cells of the terminal equipment. Here, the multiple candidate serving cells belong to the at least one candidate transmission node of the terminal equipment.

At this moment, the device 1100 further includes a first receiver, configured to receive a measurement report sent by the terminal equipment according to the measurement report request sent by the sender 1120. The measurement report contains a result of measurement performed by the terminal equipment on a DL reference signal sent by each of the multiple candidate serving cells.

Correspondingly, the processor 1110 is further configured to determine the at least one serving cell of the terminal equipment from the multiple candidate serving cells according to the measurement report received by the first receiver.

Optionally, the DL reference signal configuration information includes at least one of: information of a time-frequency resource, information of the code-domain resource or information of the space-domain resource. Here, the information of the time-frequency resource includes information of at least one physical resource block.

Optionally, the device 1100 further includes a receiver, configured to, before the sender 1120 sends the reference signal configuration message to each of the at least one candidate transmission node of the terminal equipment, receive a request message sent by the terminal equipment. The request message contains identification information of each of the multiple candidate serving cells of the terminal equipment. The identification information of each candidate serving cell indicates that a node type of the candidate transmission node to which the candidate serving cell belongs is a first type or a second type. Each node of the first type has a capability of serving as a control node and each node of the second type has no capability of serving as a control node.

Correspondingly, the sender 1120 is specifically configured to send the reference signal configuration message to each of the at least one candidate transmission node of the terminal equipment according to the request message received by the receiver.

Optionally, the sender 1120 is further configured to, before the processor 1110 generates the first transmission configuration message, send identification information of a cell of the control node to the terminal equipment. The identification information of the cell of the control node indicates that the control node has the capability of serving as a control node.

In another optional embodiment, the processor 1110 is configured to generate a reference signal configuration message. The reference signal configuration message contains DL reference signal configuration information of each of at least one first candidate serving cell of the terminal equipment. The DL reference signal configuration information includes at least one of: information of a time-frequency resource, information of a code-domain resource or information of a space-domain resource. The information of the time-frequency resource includes information of at least one physical resource block and the at least one first candidate serving cell belonging to a first candidate transmission node. The sender 1120 is configured to send the reference signal configuration message generated by the processor 1110 to the first candidate transmission node.

Optionally, the sender 1120 is further configured to send a measurement report request to the terminal equipment. The measurement report request contains DL reference signal configuration information of each of at least one candidate serving cell of the terminal equipment. Here, the at least one candidate serving cell includes the at least one first candidate serving cell.

At this moment, the device 1100 further includes a receiver, configured to receive a measurement report sent by the terminal equipment according to the measurement report request sent by the sender 1120. The measurement report contains a result of measurement performed by the terminal equipment on a DL reference signal sent by each of the at least one candidate serving cell.

Correspondingly, the processor 1110 is further configured to determine the at least one serving cell of the terminal equipment from the at least one candidate serving cell according to the measurement report received by the receiver.

Optionally, the receiver is further configured to, before the sender 1120 sends the measurement report request to the terminal equipment, receive identification information of each of the at least one candidate serving cell sent by the terminal equipment. The identification information of each candidate serving cell indicates that a node type of a candidate transmission node to which the candidate serving cell belongs is a first type or a second type. A node of the first type has a capability of serving as a control node and a node of the second type has no capability of serving as a control node.

Correspondingly, the sender 1120 is specifically configured to send the measurement report request to the terminal equipment according to the identification information, received by the receiver, of each of the at least one candidate serving cell.

Optionally, the sender 1120 is further configured to, before the processor 1110 generates the reference signal configuration message, send identification information of a cell of the control node to the terminal equipment. The identification information of the cell of the control node indicates that the control node has the capability of serving as a control node.

Optionally, the sender 1120 is further configured to send a first scheduling message to the first candidate transmission node. The first scheduling message contains at least one information of at least one UL grant or information of at least one DL SA configured to schedule data transmission between each of at least one first target serving cell of the terminal equipment and the terminal equipment. Here, the at least one first candidate serving cell includes the at least one first target serving cell.

Optionally, the sender 1120 is further configured to send a second scheduling message to the terminal equipment. The second scheduling message contains at least one information of at least one UL grant or information of at least one DL SA configured to schedule data transmission between each of in at least one target serving cell of the terminal equipment and the terminal equipment.

Optionally, the first scheduling message further contains identification information of the terminal equipment.

In another optional embodiment, the processor 1110 may be configured to generate a first scheduling message. The first scheduling message contains at least one information of at least one UL grant or information of at least one DL SA configured to schedule data transmission between at least one first target serving cell and the terminal equipment. The at least one first target serving cell belongs to a first transmission node. The sender 1120 may be configured to send the first scheduling message generated by the processor 1110 to the first transmission node.

Optionally, the first scheduling message further contains identification information of the terminal equipment.

Optionally, the sender 1120 is further configured to send a second scheduling message to the terminal equipment. The second scheduling message contains at least one information of at least one UL grant or information of at least one DL SA configured to schedule data transmission between each of in at least one target serving cell and the terminal equipment. Here, the at least one target serving cell includes the at least one first target serving cell.

It is to be understood that the device 1100 may specifically be the control node in the abovementioned embodiments and may be configured to execute each flow and/or step corresponding to the control node in the abovementioned method embodiments. Optionally, the device 1100 may further include a memory, and the memory may include a Read-Only Memory (ROM) and a Random Access Memory (RAM) and provides an instruction and data for the processor. A part of the memory may further include a nonvolatile RAM. For example, the memory may further store information of an equipment type. The processor may be configured to execute the instruction stored in the memory, and when the processor executes the instruction, the processor may execute each step corresponding to the terminal equipment in the abovementioned method embodiments.

Figure 21:
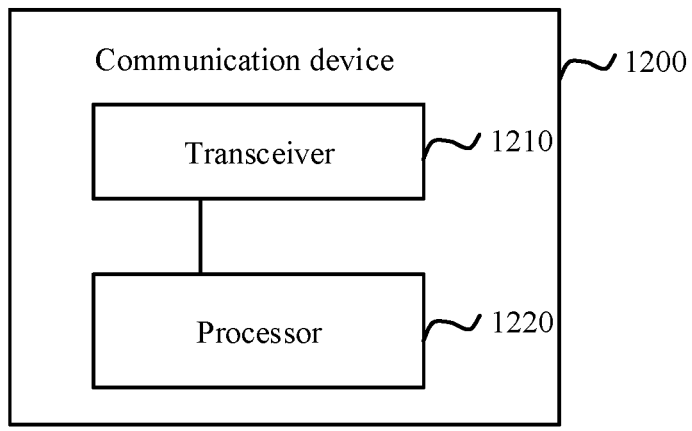
FIG. 21 is a schematic block diagram of a communication device according to another embodiment of the disclosure.

FIG. 21 is a schematic block diagram of a communication device 1200 according to another embodiment of the disclosure. The communication device 1200 includes a transceiver 1210 and a processor 1220.

In an optional embodiment, the transceiver 1210 is configured to receive a first transmission configuration message sent by a control node. The first transmission configuration message contains transmission configuration information of each of at least one first serving cell of the device. The transmission configuration information of each first serving cell includes transmission scheme information and/or PHY parameter information of each of at least one transmission configuration set of the first serving cell, and transmission resource pool information corresponding to the transmission scheme information and/or the PHY parameter information. The processor 1220 is configured to perform communication with a terminal equipment through the at least one first serving cell according to the first transmission configuration message received by the transceiver 1210.

Optionally, the PHY parameter information includes at least one of a subcarrier spacing, a frame structure, a chip rate or a common control channel configuration.

Optionally, the transmission scheme information includes at least one of a duplex manner or a multiple access scheme.

Optionally, the transmission resource pool information includes at least one of a time-domain resource, a frequency-domain resource, a code-domain resource or a space-domain resource.

Optionally, the transmission configuration information of each first serving cell further includes serial number information of each of the at least one transmission configuration set of the first serving cell.

Optionally, the transmission configuration information of each first serving cell further includes an activation indication, deactivation indication or validity period information corresponding to each of the at least one transmission configuration set of the first serving cell.

Optionally, the transceiver 1210 is further configured to receive a first scheduling message sent by the control node. The first scheduling message contains at least one information of at least one UL grant or information of at least one DL SA configured to schedule data transmission between each of at least one first target serving cell and the terminal equipment. The at least one first serving cell includes the at least one first target serving cell.

At this moment, the processor 1220 is further configured to perform data transmission with the terminal equipment through the at least one first target serving cell according to the first scheduling message received by the transceiver 1210.

Optionally, the information of the at least one UL grant includes serial number information of the transmission configuration set corresponding to each of the at least one UL grant.

Optionally, the information of the at least one DL SA includes serial number information of the transmission configuration set corresponding to each of the at least one DL SA.

Optionally, the first scheduling message further contains identification information of the terminal equipment.

Optionally, the transceiver 1210 is further configured to, before the first transmission configuration message sent by the control node is received, receive a reference signal configuration message sent by the control node. The reference signal configuration message contains DL reference signal configuration information of at least one candidate serving cell of the first transmission node. Here, the at least one candidate serving cell of the first transmission node includes the at least one first serving cell; and correspondingly, the transceiver 1210 is further configured to send a DL reference signal through the at least one candidate serving cell according to the received reference signal configuration message.

Optionally, the DL reference signal configuration information includes at least one of: information of a time-frequency resource, information of the code-domain resource or information of the space-domain resource. Here, the information of the time-frequency resource includes information of at least one physical resource block.

Optionally, the transceiver 1210 is further configured to, before the reference signal configuration message sent by the control node is received, send identification information of each of the at least one candidate serving cell of the first transmission node to the terminal equipment. The identification information of each candidate serving cell indicates that a node type of the first transmission node is a first type or a second type. A node of the first type has a capability of serving as a control node and a node of the second type has no capability of serving as a control node.

In another optional embodiment, the transceiver 1210 is configured to receive a reference signal configuration message sent by the control node. The reference signal configuration message contains DL reference signal configuration information of each of at least one first candidate serving cell of the terminal equipment. The DL reference signal configuration information includes at least one of: information of a time-frequency resource, information of a code-domain resource or information of a space-domain resource. The information of the time-frequency resource includes information of at least one physical resource block. The at least one first candidate serving cell belongs to the device. And the transceiver 1210 is configured to send a DL reference signal through the at least one first candidate serving cell according to the received reference signal configuration message.

Optionally, the transceiver 1210 is further configured to, before the reference signal configuration message sent by the control node is received, send identification information of each of the at least one first candidate serving cell to the terminal equipment. The identification information of each first candidate serving cell indicates that a node type of a first node is a first type or a second type. A node of the first type has a capability of serving as a control node and a node of the second type has no capability of serving as a control node.

Optionally, the transceiver 1210 is further configured to receive a first scheduling message sent by the control node. The first scheduling message contains at least one information of at least one UL grant or information of at least one DL SA configured to schedule data transmission between each of at least one first target serving cell and the terminal equipment. The at least one first candidate serving cell includes the at least one first target serving cell.

Correspondingly, the processor 1220 is configured to perform data transmission with the terminal equipment through the at least one first target serving cell according to the first scheduling message received by the transceiver 1210.

Optionally, the information of the at least one UL grant includes serial number information of a transmission configuration set corresponding to each of the at least one UL grant.

Optionally, the information of the at least one DL SA includes serial number information of a transmission configuration set corresponding to each of the at least one DL SA.

Optionally, the first scheduling message further contains identification information of the terminal equipment.

In another optional embodiment, the transceiver 1210 is configured to receive a first scheduling message sent by the control node. The first scheduling message contains at least one information of at least one UL grant or information of at least one DL SA configured to schedule data transmission between each of at least one first target serving cell of the device and the terminal equipment. The processor 1220 is configured to perform data transmission with the terminal equipment through the at least one first target serving cell according to the first scheduling message received by the transceiver 1210.

It is to be understood that the device 1200 may specifically be the transmission node in the abovementioned embodiments and may be configured to execute each flow and/or step corresponding to the transmission node in the abovementioned method embodiments. Optionally, the device 1200 may further include a memory, and the memory may include a ROM and a RAM and provides an instruction and data for the processor. A part of the memory may further include a nonvolatile RAM. For example, the memory may further store information of an equipment type. The processor may be configured to execute the instruction stored in the memory, and when the processor executes the instruction, the processor may execute each step corresponding to the transmission node in the abovementioned method embodiments.

Figure 22:
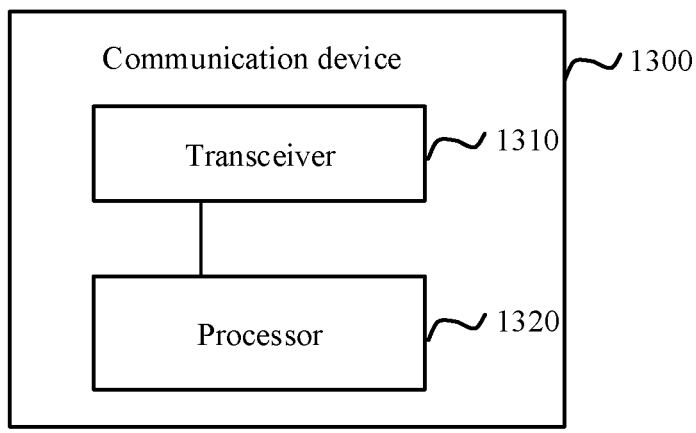
FIG. 22 is a schematic block diagram of a communication device according to another embodiment of the disclosure.

FIG. 22 is a communication device 1300 according to another embodiment of the disclosure. The communication device 1300 includes a transceiver 1310 and a processor 1320.

In an optional embodiment, the transceiver 1310 is configured to receive a second transmission configuration message sent by a control node. The second transmission configuration message contains transmission configuration information of each of at least one serving cell of a terminal equipment. The transmission configuration information of each serving cell includes transmission scheme information and/or PHY parameter information of each of at least one transmission configuration set of the serving cell and transmission resource pool information corresponding to the transmission scheme information and/or the PHY parameter information. The processor 1320 is configured to perform communication with the at least one serving cell according to the second transmission configuration message received by the transceiver 1310.

Optionally, the transceiver 1310 is further configured to receive a second scheduling message sent by the control node. The second scheduling message contains at least one information of at least one UL grant or information of at least one DL SA configured to schedule data transmission between each of in at least one target serving cell and the terminal equipment. The at least one serving cell of the terminal equipment includes the at least one target serving cell.

Correspondingly, the processor 1320 is further configured to perform data transmission with the at least one target serving cell according to the second scheduling message received by the transceiver 1310.

Optionally, the transceiver 1310 is further configured to, before the second transmission configuration message sent by the control node is received, receive a measurement report request sent by the control node. The measurement report request contains DL reference signal configuration information of each of at least one candidate serving cell of the terminal equipment. The at least one candidate serving cell of the terminal equipment includes the at least one serving cell; and correspondingly, the processor 1320 is further configured to measure a DL reference signal sent by each of the at least one candidate serving cell according to the measurement report request received by the transceiver 1310.

Optionally, the DL reference signal configuration information includes at least one of: information of a time-frequency resource, information of a code-domain resource or information of a space-domain resource. Here, the information of the time-frequency resource includes information of at least one physical resource block.

Optionally, the transceiver 1310 is further configured to, before the measurement report request sent by the control node is received, receive identification information of at least one cell of each of multiple nodes from the node. Here, the identification information of each cell indicates that a node type of the node to which the cell belongs is a first type or a second type, a node of the first type has a capability of serving as a control node, a node of the second type has no capability of serving as a control node, and the multiple nodes include the control node and at least one transmission node.

Correspondingly, the processor 1320 is further configured to determine the control node and the at least one transmission node according to the identification information, received by the transceiver 1310, of each cell in multiple cells.

In another optional embodiment, the transceiver 1310 is configured to receive a measurement report request sent by the control node. The measurement report request contains DL reference signal configuration information of each of at least one candidate serving cell of the terminal equipment. Here, the DL reference signal configuration information includes at least one of: information of a time-frequency resource, information of a code-domain resource or information of a space-domain resource. The information of the time-frequency resource includes information of at least one physical resource block. The processor 1320 is configured to measure a DL reference signal sent by each of the at least one candidate serving cell according to the measurement report request received by the transceiver 1310.

Optionally, the transceiver 1310 is further configured to: before the measurement report request sent by the control node is received, receive identification information of each of the at least one candidate serving cell. Here, the identification information of each candidate serving cell indicates that a node type of each candidate serving cell is a first type or a second type. Here, a node of the first type has the capability of serving as a control node, and a node of the second type has no capability of serving as a control node.

The transceiver 1310 is configured to send a request message to the control node, the request message containing the identification information, received by the transceiver 1310, of each of the at least one candidate serving cell.

The transceiver 1310 is configured to receive the measurement report request sent by the control node according to the request message sent by the sender.

Optionally, the transceiver 1310 is further configured to send a second scheduling message sent by the control node. The second scheduling message contains at least one information of at least one UL grant or information of at least one DL SA configured to schedule data transmission between at least one target serving cell and the terminal equipment. Here, the at least one candidate serving cell includes the at least one target serving cell.

Optionally, the information of the at least one UL grant includes serial number information of a transmission configuration set corresponding to each of the at least one UL grant.

Optionally, the information of the at least one DL SA includes serial number information of a transmission configuration set corresponding to each of the at least one DL SA.

It is to be understood that the device 1300 may specifically be the terminal equipment in the abovementioned embodiments and may be configured to execute each flow and/or step corresponding to the terminal equipment in the abovementioned method embodiments. Optionally, the device 1300 may further include a memory, and the memory may include a ROM and a RAM and provides an instruction and data for the processor. A part of the memory may further include a nonvolatile RAM. For example, the memory may further store information of an equipment type. The processor may be configured to execute the instruction stored in the memory, and when the processor executes the instruction, the processor may execute each step corresponding to the terminal equipment in the abovementioned method embodiments.

It is to be understood that, in the embodiments of the disclosure, the processor may be a Central Processing Unit (CPU) and the processor may also be another universal processor, a Digital Signal Processor (DSP), an ASIC, a Field-Programmable Gate Array (FPGA) or another programmable logic device, discrete gate or transistor logic device and discrete hardware component and the like. The universal processor may be a microprocessor or the processor may also be any conventional processor and the like.

In an implementation process, each step of the method may be completed by an integrated logic circuit of hardware in the processor or an instruction in a software form. The steps of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory, and the processor reads the instruction in the memory, and completes the steps of the method in combination with hardware. No more detailed descriptions will be made herein to avoid repetitions.

Those of ordinary skilled in the art may realize that the steps and units of each method described in combination with the embodiments disclosed in the disclosure may be implemented by electronic hardware, computer software or a combination of the two. For clearly describing exchangeability of hardware and software, the steps and compositions of each embodiment have been generally described in the foregoing descriptions according to functions. Whether these functions are executed in a hardware or software manner depends on specific applications and design constraints of the technical solutions. Those of ordinary skilled in the art may realize the described functions for each specific application by virtue of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the application, It is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments of the disclosure according to a practical requirement.

In addition, each functional unit in each embodiment of the disclosure may be integrated into a processing unit, each unit may also physically exist independently, and two or more than two units may also be integrated into a unit. The integrated unit may be implemented in a hardware form and may also be implemented in form of software functional unit.

When being implemented in form of software functional unit and sold or used as an independent product, the integrated unit may be stored in a computer-readable storage medium. Based on such an understanding, the technical solutions of the disclosure substantially or parts making contributions to the conventional art or all or part of the technical solutions may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Various equivalent modifications or replacements are apparent to those skilled in the art within the technical scope disclosed by the disclosure shall fall within the scope of protection of the disclosure and these modifications or replacements shall fall within the scope of protection of the disclosure. Therefore, the scope of protection of the disclosure shall be subject to the scope of protection of the claims.

The invention claimed is:

1. A communication method, comprising:
    generating, by a control node, a first transmission configuration message, wherein the first transmission configuration message contains transmission configuration information of each of at least one first serving cell of a terminal equipment, the transmission configuration information of each first serving cell comprises transmission scheme information and/or Physical (PHY) parameter information of each of at least one transmission configuration set of the first serving cell, and transmission resource pool information corresponding to the transmission scheme information and/or the PHY parameter information, and the at least one first serving cell belongs to a first transmission node; and
    sending, by the control node, the first transmission configuration message to the first transmission node;
    wherein the method further comprises:
    sending, by the control node, a first scheduling message to the first transmission node, the first scheduling message containing at least one of information of at least one Uplink (UL) grant or information of at least one Downlink (DL) Scheduling Assignment (SA) configured to schedule data transmission between each of at least one first target serving cell and the terminal equipment, and the at least one first serving cell comprising the at least one first target serving cell; and/or
    sending, by the control node, a second scheduling message to the terminal equipment, the second scheduling message containing at least one information of at least one UL grant or information of at least one DL SA configured to schedule data transmission between each of at least one target serving cell of the terminal equipment and the terminal equipment.

2. The method of claim 1, wherein the PHY parameter information comprises at least one of a subcarrier spacing, a frame structure, a chip rate or a common control channel configuration;
    the transmission scheme information comprises at least one of a duplex manner or a multiple access scheme; and
    the transmission resource pool information comprises at least one of a time-domain resource, a frequency-domain resource, a code-domain resource or a space-domain resource.

3. The method of claim 1, wherein the transmission configuration information of each first serving cell further comprises: serial number information of each of the at least one transmission configuration set of the first serving cell, or wherein the transmission configuration information of each first serving cell further comprises: an activation indication, deactivation indication or validity period information corresponding to each of the at least one transmission configuration set of the first serving cell.

4. The method of claim 1, further comprising:
    sending, by the control node, a second transmission configuration message to the terminal equipment, the second transmission configuration message containing transmission configuration information of each of at least one serving cell of the terminal equipment, wherein the at least one serving cell comprises the at least one first serving cell.

5. The method of claim 1,
    wherein the information of the at least one UL grant comprises serial number information of the transmission configuration set corresponding to each of the at least one UL grant; and the information of the at least one DL SA comprises serial number information of the transmission configuration set corresponding to each of the at least one DL SA
    or wherein the first scheduling message further contains identification information of the terminal equipment.

6. The method of claim 1, before generating, by the control node, the first transmission configuration message, further comprising:
    sending, by the control node, a reference signal configuration message to each of at least one candidate transmission node of the terminal equipment, the reference signal configuration message containing DL reference signal configuration information of each of at least one candidate serving cell of each candidate transmission node, and the at least one candidate transmission node comprising the first transmission node.

7. The method of claim 6, further comprising:
    sending, by the control node, a measurement report request to the terminal equipment, the measurement report request containing the DL reference signal configuration information of each of a plurality of candidate serving cells of the terminal equipment, wherein the plurality of candidate serving cells belong to the at least one candidate transmission node of the terminal equipment;
    receiving, by the control node, a measurement report sent by the terminal equipment according to the measurement report request, the measurement report containing a result of measurement performed by the terminal equipment on a DL reference signal sent by each of the plurality of candidate serving cells; and
    determining, by the control node, the at least one serving cell of the terminal equipment from the plurality of candidate serving cells according to the measurement report.

8. The method of claim 6, wherein the DL reference signal configuration information comprises at least one of: information of a time-frequency resource, information of a code-domain resource or information of a space-domain resource, wherein the information of the time-frequency resource comprises information of at least one physical resource block.

9. The method of claim 6, before sending, by the control node, the reference signal configuration message to each of the at least one candidate transmission node of the terminal equipment, further comprising: receiving, by the control node, a request message sent by the terminal equipment, the request message containing identification information of each of the plurality of candidate serving cells of the terminal equipment, the identification information of each candidate serving cell indicating that a type of the candidate transmission node to which the candidate serving cell belongs is a first type or a second type, each node of the first type having a capability of serving as a control node and each node of the second type having no capability of serving as a control node, wherein sending, by the control node, the reference signal configuration message to each of the at least one candidate transmission node of the terminal equipment comprises: sending, by the control node, the reference signal configuration message to each of the at least one candidate transmission node of the terminal equipment according to the request message,
or before generating, by the control node, the first transmission configuration message, the method further comprises: sending, by the control node, identification information of a cell of the control node to the terminal equipment, the identification information of the cell of the control node indicating that the control node has the capability of serving as a control node.

10. A method for communication, comprising:
receiving, by a first transmission node, a first transmission configuration message sent by a control node, the first transmission configuration message containing transmission configuration information of each of at least one first serving cell of the first transmission node, and the transmission configuration information of each first serving cell comprising transmission scheme information and/or Physical (PHY) parameter information of each of at least one transmission configuration set of the first serving cell, and transmission resource pool information corresponding to the transmission scheme information and/or the PHY parameter information; and
performing, by the first transmission node, communication with a terminal equipment through the at least one first serving cell according to the first transmission configuration message;
wherein the method further comprises:
receiving, by the first transmission node, a first scheduling message sent by the control node, the first scheduling message containing at least one of information of at least one Uplink (UL) grant or information of at least one Downlink (DL) Scheduling Assignment (SA) configured to schedule data transmission between each of at least one first target serving cell and the terminal equipment, and the at least one first serving cell comprising the at least one first target serving cell; and
performing, by the first transmission node, data transmission with the terminal equipment through the at least one first target serving cell according to the first scheduling message.

11. The method of claim 10, wherein the PHY parameter information comprises at least one of a subcarrier spacing, a frame structure, a chip rate or a common control channel configuration;
the transmission scheme information comprises at least one of a duplex manner or a multiple access scheme; and
the transmission resource pool information comprises at least one of a time-domain resource, a frequency-domain resource, a code-domain resource or a space-domain resource.

12. The method of claim 10, wherein the transmission configuration information of each first serving cell further comprises: serial number information of each of the at least one transmission configuration set of the first serving cell, or wherein the transmission configuration information of each first serving cell further comprises: an activation indication, deactivation indication or validity period information corresponding to each of the at least one transmission configuration set of the first serving cell.

13. The method of claim 10,
wherein the information of the at least one UL grant comprises serial number information of the transmission configuration set corresponding to each of the at least one UL grant; and the information of the at least one DL SA comprises serial number information of the transmission configuration set corresponding to each of the at least one DL SA,
and wherein the first scheduling message further contains identification information of the terminal equipment.

14. The method of claim 10, before receiving, by the first transmission node, the first transmission configuration message sent by the control node, further comprising:
receiving, by the first transmission node, a reference signal configuration message sent by the control node, the reference signal configuration message containing DL reference signal configuration information of at least one candidate serving cell of the first transmission node, wherein the at least one candidate serving cell of the first transmission node comprises the at least one first serving cell; and
sending, by the first transmission node, a DL reference signal through the at least one candidate serving cell according to the reference signal configuration message.

15. The method of claim 14, wherein the DL reference signal configuration information comprises at least one of: information of a time-frequency resource, information of a code-domain resource or information of a space-domain resource, wherein the information of the time-frequency resource comprises information of at least one physical resource block, or
before receiving, by the first transmission node, the reference signal configuration message sent by the control node, the method further comprises:
sending, by the first transmission node, identification information of each of the at least one candidate serving cell of the first transmission node to the terminal equipment, the identification information of each candidate serving cell indicating that a type of the first transmission node is a first type or a second type, a node of the first type having a capability of serving as a control node and a node of the second type having no capability of serving as a control node.

16. A method for communication, comprising:
receiving, by a terminal equipment, a second transmission configuration message sent by a control node, the second transmission configuration message containing transmission configuration information of each of at least one serving cell of the terminal equipment, and the transmission configuration information of each serving cell comprising transmission scheme information and/or Physical (PHY) parameter information of each of at least one transmission configuration set of the serving cell and transmission resource pool information corresponding to the transmission scheme information and/or the PHY parameter information; and
performing, by the terminal equipment, communication with the at least one serving cell according to the second transmission configuration message;
wherein the method further comprises:
receiving, by the terminal equipment, a second scheduling message sent by the control node, the second scheduling message containing at least one of information of at least one Uplink (UL) grant or information of at least one Downlink (DL) Scheduling Assignment (SA) configured to schedule data transmission between each of at least one target serving cell and the terminal equipment and the at least one serving cell of the terminal equipment comprising the at least one target serving cell; and performing, by the terminal equipment, data transmission with the at least one target serving cell according to the second scheduling message.

17. The method of claim 16, wherein the PHY parameter information comprises at least one of a subcarrier spacing, a frame structure, a chip rate or a common control channel configuration;

the transmission scheme information comprises at least one of a duplex manner or a multiple access scheme; and the transmission resource pool information comprises at least one of a time-domain resource, a frequency-domain resource, a code-domain resource or a space-domain resource.

18. The method of claim 16, wherein the transmission configuration information of each serving cell further comprises: serial number information of each of the at least one transmission configuration set of the serving cell, or wherein the transmission configuration information of each serving cell further comprises: an activation indication, deactivation indication or validity period information corresponding to each of the at least one transmission configuration set of the serving cell.

19. The method of claim 16,
wherein the information of the at least one UL grant comprises serial number information of the transmission configuration set corresponding to each of the at least one UL grant; and the information of the at least one DL SA comprises serial number information of the transmission configuration set corresponding to each of the at least one DL SA.

20. The method of claim 16, before receiving, by the terminal equipment, the second transmission configuration message sent by the control node, further comprising: receiving, by the terminal equipment, a measurement report request sent by the control node, the measurement report request containing DL reference signal configuration information of each of at least one candidate serving cell of the terminal equipment, and the at least one candidate serving cell of the terminal equipment comprising the at least one serving cell; and measuring, by the terminal equipment, a DL reference signal sent by each of the at least one candidate serving cell according to the measurement report request, wherein the DL reference signal configuration information comprises at least one of: information of a time-frequency resource, information of a code-domain resource or information of a space-domain resource, wherein the information of the time-frequency resource comprises information of at least one physical resource block, or before receiving, by the terminal equipment, the measurement report request sent by the control node, further comprising: receiving, by the terminal equipment, identification information of at least one cell of each of a plurality of nodes from the plurality of nodes, wherein the identification information of each cell indicates that a type of the node to which the cell belongs is a first type or a second type, a node of the first type has a capability of serving as a control node, a node of the second type has no capability of serving as a control node, and the plurality of nodes comprise the control node and at least one transmission node; and determining, by the terminal equipment, the control node and the at least one transmission node according to the received identification information of each of a plurality of cells.

* * * * *